United States Patent
Suk et al.

(10) Patent No.: US 11,891,067 B2
(45) Date of Patent: Feb. 6, 2024

(54) VEHICLE CONTROL APPARATUS AND OPERATING METHOD THEREOF

(71) Applicant: Electronics and Telecommunications Research Institute, Daejeon (KR)

(72) Inventors: Jung Hee Suk, Daejeon (KR); Chun-Gi Lyuh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 251 days.

(21) Appl. No.: 17/117,829

(22) Filed: Dec. 10, 2020

(65) Prior Publication Data

US 2021/0182621 A1 Jun. 17, 2021

(30) Foreign Application Priority Data

Dec. 11, 2019 (KR) .......................... 10-2019-0164963
Sep. 18, 2020 (KR) .......................... 10-2020-0120243

(51) Int. Cl.
*B60W 40/06* (2012.01)
*B60W 60/00* (2020.01)
(Continued)

(52) U.S. Cl.
CPC ............ *B60W 40/06* (2013.01); *B60W 30/09* (2013.01); *B60W 30/0956* (2013.01);
(Continued)

(58) Field of Classification Search
CPC .. B60W 30/09; B60W 30/0956; B60W 40/06; B60W 60/0015; B60W 2420/42;
(Continued)

(56) References Cited

U.S. PATENT DOCUMENTS 6,829,388 B1 * 12/2004 Sakurai ..................... G06T 7/12
340/435
8,436,902 B2 * 5/2013 Kuehnle ................. G01W 1/14
348/148
(Continued)

FOREIGN PATENT DOCUMENTS

CN 110930323 3/2020
JP 2019-200773 11/2019
(Continued)

*Primary Examiner* — Thomas Ingram
*Assistant Examiner* — Faris Asim Shaikh
(74) *Attorney, Agent, or Firm* — KILE PARK REED & HOUTTEMAN PLLC

(57) ABSTRACT

Disclosed is an operating method of a vehicle control apparatus controlling autonomous driving based on a vehicle external object including performing primary object detection based on a first vehicle external image received from a camera to obtain first object information, setting a first reflective area for reflection light based on the first object information, generating a second vehicle external image, in which a reflective image inside the first reflective area is removed from the first vehicle external image, using pixel values inside the first reflective area, performing secondary object detection based on the second vehicle external image to obtain second object information, determining reliability of the second object information based on information about the reflective image and the second object information, and controlling the autonomous driving of the vehicle based on the second object information when the reliability of the second object information is higher than a setting value.

13 Claims, 16 Drawing Sheets

(51) Int. Cl.
  *B60W 30/095* (2012.01)
  *B60W 30/09* (2012.01)
  *G06V 20/58* (2022.01)
  *G06V 20/56* (2022.01)
  *G06F 18/21* (2023.01)
  *G06F 18/23* (2023.01)
(52) U.S. Cl.
  CPC ....... B60W 60/0015 (2020.02); G06F 18/217 (2023.01); G06F 18/23 (2023.01); G06V 20/56 (2022.01); G06V 20/584 (2022.01); G06V 20/588 (2022.01); *B60W 2420/42* (2013.01); *B60W 2552/00* (2020.02)
(58) Field of Classification Search
  CPC ............ B60W 2552/00; G06K 9/6262; G06K 9/6218; G06V 10/22; G06V 10/42; G06V 20/584; G06V 20/588; G06V 20/56; G06V 10/457; G06V 10/751; G06V 40/23; G06V 20/00; G06T 3/0093; G06T 3/4023; G06T 3/4053; G06T 3/4069; G06T 3/40; G06T 5/002; G06T 5/50; G06T 7/33; G06T 7/73; G06T 7/80; G06T 7/187; G06T 7/231; G06T 7/254; H04N 5/217; G09G 2340/10; G09G 2340/12; G02B 27/0018; G01N 2015/0846; G01S 17/00; G06F 18/217
  See application file for complete search history.

(56) References Cited

U.S. PATENT DOCUMENTS

| | | | | |
|---|---|---|---|---|
| 8,768,048 | B1* | 7/2014 | Kwatra | G06V 10/768 |
| | | | | 382/225 |
| 8,941,739 | B2* | 1/2015 | Yoo | G01S 7/4802 |
| | | | | 348/148 |
| 9,047,677 | B2* | 6/2015 | Sedky | G06T 7/194 |
| 10,564,267 | B2* | 2/2020 | Grauer | G01S 7/483 |
| 10,663,974 | B2* | 5/2020 | Suk | G06V 10/96 |
| 11,348,269 | B1* | 5/2022 | Ebrahimi Afrouzi | |
| | | | | G01S 7/4804 |
| 2004/0042638 | A1* | 3/2004 | Iwano | G06T 7/12 |
| | | | | 348/148 |
| 2007/0263901 | A1* | 11/2007 | Wu | G06V 20/584 |
| | | | | 382/104 |
| 2009/0295917 | A1* | 12/2009 | Zhang | G08G 1/165 |
| | | | | 345/589 |
| 2011/0052080 | A1* | 3/2011 | Tamura | G06V 20/588 |
| | | | | 382/201 |
| 2012/0127309 | A1* | 5/2012 | Lee | G06V 10/25 |
| | | | | 382/104 |
| 2012/0163671 | A1* | 6/2012 | Choi | G06V 20/58 |
| | | | | 382/104 |
| 2013/0141577 | A1* | 6/2013 | Yoo | G01N 21/55 |
| | | | | 356/612 |
| 2015/0169965 | A1 | 6/2015 | Lee et al. | |
| 2015/0278616 | A1* | 10/2015 | Li | G06K 9/6269 |
| | | | | 382/103 |
| 2015/0310284 | A1* | 10/2015 | Sakamoto | B62D 15/025 |
| | | | | 382/104 |
| 2017/0070650 | A1* | 3/2017 | Kim | H04N 5/3572 |
| 2018/0041660 | A1* | 2/2018 | Kakuta | H04N 1/6008 |
| 2018/0180421 | A1* | 6/2018 | Holz | G01S 17/88 |
| 2018/0203451 | A1 | 7/2018 | Cronin et al. | |
| 2018/0211119 | A1* | 7/2018 | Liu | B60W 30/09 |
| 2019/0057507 | A1* | 2/2019 | El-Khamy | G06T 5/20 |
| 2019/0087674 | A1* | 3/2019 | Gao | G06F 18/24317 |
| 2019/0156485 | A1* | 5/2019 | Pfeiffer | G06T 7/11 |
| 2019/0180117 | A1* | 6/2019 | Okada | B60W 40/072 |
| 2019/0208113 | A1* | 7/2019 | Sandstrom | G01S 17/36 |
| 2019/0258878 | A1* | 8/2019 | Koivisto | G06V 10/762 |
| 2019/0347804 | A1* | 11/2019 | Kim | G06T 7/194 |
| 2019/0353774 | A1 | 11/2019 | Chondro et al. | |
| 2019/0384304 | A1* | 12/2019 | Towal | G06V 20/56 |
| 2020/0074639 | A1* | 3/2020 | Zhao | G06T 7/194 |
| 2020/0193177 | A1* | 6/2020 | Kozonek | G06N 3/08 |
| 2020/0210717 | A1* | 7/2020 | Hou | G06T 7/70 |
| 2020/0282929 | A1* | 9/2020 | Kroeger | G01S 7/497 |
| 2021/0026355 | A1* | 1/2021 | Chen | G06V 10/82 |
| 2021/0097308 | A1* | 4/2021 | Kumar | G06V 10/44 |
| 2021/0150230 | A1* | 5/2021 | Smolyanskiy | G06V 10/803 |
| 2021/0156960 | A1* | 5/2021 | Popov | G01S 13/89 |
| 2021/0182621 | A1* | 6/2021 | Suk | G06K 9/6262 |
| 2021/0392261 | A1* | 12/2021 | Nossek | H04N 23/73 |

FOREIGN PATENT DOCUMENTS

| | | |
|---|---|---|
| KR | 10-2012-0018566 | 3/2012 |
| KR | 10-2013-0061443 | 6/2013 |
| KR | 10-1462913 | 11/2014 |
| KR | 10-2015-0070800 | 6/2015 |
| KR | 10-2017-0015113 | 2/2017 |

* cited by examiner

VEHICLE CONTROL APPARATUS AND OPERATING METHOD THEREOF

CROSS-REFERENCE TO RELATED APPLICATIONS

This application claims priority under 35 U.S.C. § 119 to Korean Patent Application No. 10-2019-0164963 filed on Dec. 11, 2019 and No. 10-2020-0120243 filed on Sep. 18, 2020, in the Korean Intellectual Property Office, the disclosures of which are incorporated by reference herein in their entireties.

BACKGROUND

Embodiments of the disclosure described herein relate to a vehicle control apparatus, and more particularly, relate to a vehicle control apparatus that controls the autonomous driving of a vehicle based on object detection, and an operating method thereof.

For the convenience of users employing vehicles, various sensors, electronic devices, and the like have been recently provided. In particular, an advanced driver assistance system (ADAS) has been actively researched for a user's driving convenience. Furthermore, autonomous vehicles have been actively developed.

The ADAS may use a variety of sensors. Such the sensors include radar, LiDAR, a camera, and the like. The representative sensor thereof is a camera, which is used to detect objects such as other vehicles, pedestrians, lines, signs, and the like in an image outside a vehicle. However, in the case of cameras, the reliability of object detection may be reduced depending on a driving environment. For example, the light emitted from the headlamps of a vehicle, the taillights of a vehicle, the brake lights of a vehicle, streetlights, and traffic lights is reflected by wet or snow-covered roads, in rainy or snowy weather, especially at night. The camera may not correctly detect objects due to the reflected light.

SUMMARY

Embodiments of the disclosure provide a vehicle control apparatus that provides highly-reliable object information regardless of a driving environment and controls the autonomous driving of a vehicle based on the highly-reliable object information, and an operating method thereof.

According to an embodiment, an operating method of a vehicle control apparatus controlling autonomous driving of a vehicle based on a vehicle external object includes performing primary object detection based on a first vehicle external image received from a camera to obtain first object information, setting a first reflective area for reflection light based on the first object information, generating a second vehicle external image, in which a reflective image inside the first reflective area is removed from the first vehicle external image, using pixel values inside the first reflective area, performing secondary object detection based on the second vehicle external image to obtain second object information, determining reliability of the second object information based on information about the reflective image and the second object information, and controlling the autonomous driving of the vehicle based on the second object information when the reliability of the second object information is higher than a setting value.

In an embodiment, the operating method of the vehicle control apparatus further includes obtaining driving environment information including at least one of driving time information, driving weather information, and road state information, and operating mode information about whether the vehicle is in an autonomous driving mode, and setting a control mode based on the driving environment information and the operating mode information. The vehicle control apparatus controls the autonomous driving of the vehicle based on the second object information when the determined control mode is a caution mode, and the vehicle control apparatus controls the autonomous driving of the vehicle based on the first object information when the determined control mode is a normal mode.

In an embodiment, the obtaining of the first object information includes detecting a light source from the first vehicle external image and obtaining the first object information including at least one of location information, size information, brightness information, and color information of the light source.

In an embodiment, the setting of the first reflective area includes detecting a road horizontal line from the first vehicle external image, determining a horizontal location of the first reflective area corresponding to an intersection point between a center line of the light source and the road horizontal line, determining a width of the first reflective area proportional to a width of the light source, based on the first object information, and determining a length of the first reflective area extending in a first direction from the road horizontal line. Herein, the first direction is a direction facing the vehicle from the road horizontal line.

In an embodiment, the length of the first reflective area extends in the first direction from one end in the first direction of the light source when the light source is positioned in the first direction from the road horizontal line.

In an embodiment, the generating of the second vehicle external image includes calculating the pixel values inside the first reflective area, generating a cluster corresponding to the reflective image based on the pixel values, setting a second reflective area included in the first reflective area, based on the cluster, and removing the cluster within the second reflective area.

In an embodiment, the generating of the cluster includes calculating a reference pixel value based on the first object information, detecting pixels having a pixel value, which is not less than the reference pixel value, inside the first reflective area, and generating the cluster by clustering the pixels.

In an embodiment, the setting of the second reflective area includes calculating a center point location, a first direction size, and a second direction size of the cluster, and setting the second reflective area of a size, which is more increased by a first setting value in a first direction than the first direction size, and is more increased by a second setting value in a second direction than the second direction size, at the center point location.

In an embodiment, the second reflective area is divided into a first area inside the cluster and a second area outside the cluster. The removing of the cluster includes replacing first pixel values inside the first area with an average value of second pixel values inside the second area.

In an embodiment, the determining of the reliability of the second object information includes setting an object detection area based on the second object information, detecting an overlapping area in which the object detection area overlaps with the second reflective area, calculating an intersection over union (IoU) value based on the overlapping area, and comparing the IoU value with a threshold value.

In an embodiment, the calculating of the IoU value includes calculating the IoU value for each of the plurality of overlapping areas when the overlapping area includes a plurality of overlapping areas.

In an embodiment, the comparing of the IoU value with the threshold value includes determining that the reliability of the second object information is higher than the setting value when the IoU value is less than the threshold value, and determining that the reliability of the second object information is lower than the setting value when the IoU value is greater than the threshold value.

In an embodiment, the method further includes setting a third reflective area of a size smaller than the second reflective area when it is determined that the reliability of the second object information is lower than the setting value.

In an embodiment, the controlling of the autonomous driving of the vehicle includes determining a driving route based on the second object information and controlling at least one of a vehicle driving device, a vehicle braking device, and a vehicle steering device such that the vehicle drives autonomously along the driving route.

According to an embodiment, a vehicle control apparatus controlling autonomous driving of a vehicle based on a vehicle external object includes a control unit for controlling entry into a caution mode, based on driving environment information and operating mode information, an object detection unit for performing primary object detection based on a vehicle external image to obtain first object information, and for performing secondary object detection based on a ghost-removal image to output second object information, in the caution mode, a reflective area setting unit for setting a first reflective area for reflection light based on the first object information, in the caution mode, a reflective image removal unit for generating the ghost-removal image, in which a reflective image inside a first reflective area is removed from the vehicle external image, based on pixel values inside the first reflective area, a reliability determination unit for determining reliability of the second object information based on the second object information and information about the reflective image, and a vehicle control unit for controlling the autonomous driving of the vehicle based on the second object information when the reliability of the second object information is higher than a setting value.

In an embodiment, the control unit controls the reflective area setting unit, the reflective image removal unit, and the reliability determination unit to be deactivated, in a normal mode.

BRIEF DESCRIPTION OF THE FIGURES

The above and other objects and features of the disclosure will become apparent by describing in detail embodiments thereof with reference to the accompanying drawings.

DETAILED DESCRIPTION

Hereinafter, embodiments of the disclosure may be described in detail and clearly to such an extent that an ordinary one in the art easily implements the disclosure.

In the detailed description or drawings, the terms "unit", "engine", "module", etc. or function blocks performing various operations may be implemented with software, firmware, a hardware circuit, or various combinations thereof.

Figure 1:
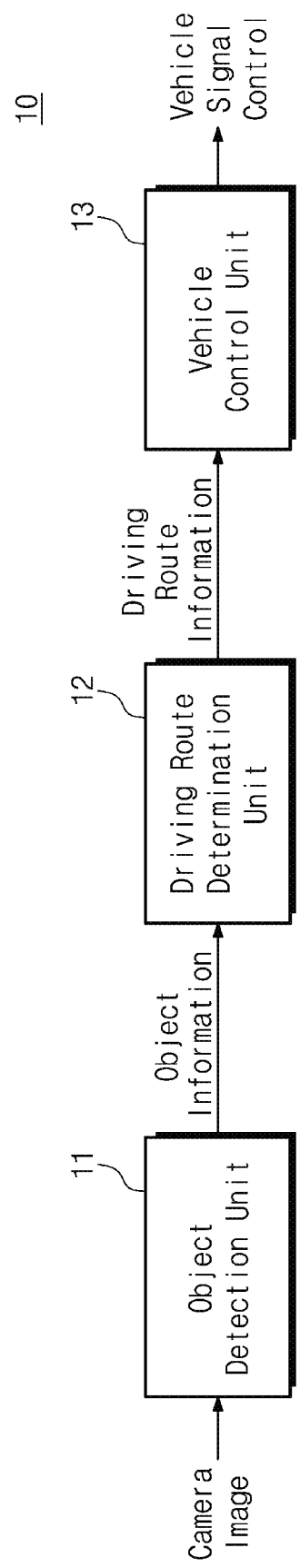
FIG. 1 is an example of block diagram of a vehicle control apparatus.

FIG. 1 is an example of block diagram of a vehicle control apparatus. Referring to FIG. 1, a vehicle control apparatus 10 may control the driving of a vehicle based on object information. For example, the vehicle control apparatus 10 may include an object detection unit 11, a driving route determination unit 12, and a vehicle control unit 13.

The object detection unit 11 may receive a camera image, and may detect an object from the camera image to generate object information. The object information may include information about whether an object is present, location information of the object, information about a distance between a vehicle and the object, and information about the relative speed between the vehicle and the object. The object detection unit 11 may provide the generated object information to the driving route determination unit 12.

The driving route determination unit 12 may receive object information from the object detection unit 11 and then may determine a driving route. For example, the driving route determination unit 12 may receive information about another vehicle entering the driving lane of the vehicle in a ramp way, and may generate driving route information to change the driving lane. The driving route determination unit 12 may provide the generated driving route information to the vehicle control unit 13.

The vehicle control unit 13 may receive the driving route information from the driving route determination unit 12 and may control the driving of the vehicle. The vehicle control unit 13 may generate a vehicle control signal, such as an acceleration control signal for increasing a vehicle speed, a deceleration control signal for decreasing a vehicle speed, and a steering control signal for changing the traveling direction of a vehicle. The vehicle control unit 13 may provide the vehicle control signal as an input signal of each driving device installed in the vehicle to drive along the generated driving route.

As a result, the vehicle control apparatus 10 may control the driving of the vehicle based on an object detected through a camera image. That is, as the accuracy or reliability of object detection by the camera image is higher, the vehicle control apparatus 10 may safely control the driving of a vehicle. However, in rain or snow or at night, the camera image may not only have low image quality, but also include a lot of distorted information. As a result, the accuracy of object detection and the reliability of the object information obtained through the object detection may be reduced.

For example, the light emitted from street lights may be reflected by water on a road, in a rainy driving environment. Such the reflected light may be captured by a camera attached to a vehicle, and may be included in the camera image received by the object detection unit 11. In this case, the object detection unit 11 may detect the reflected light as an object, or may skip the detection of another object by the reflected light. Because the driving route may be determined based on the incorrectly-detected objects, the driving stability may be reduced.

Accordingly, even in a specific driving environment, such as in rainy or snowy driving environments or night driving environments, there is a need for a vehicle electronic device capable of obtaining reliable object information and controlling the driving of a vehicle based on the reliable object information, and an operating method thereof.

Figure 2:
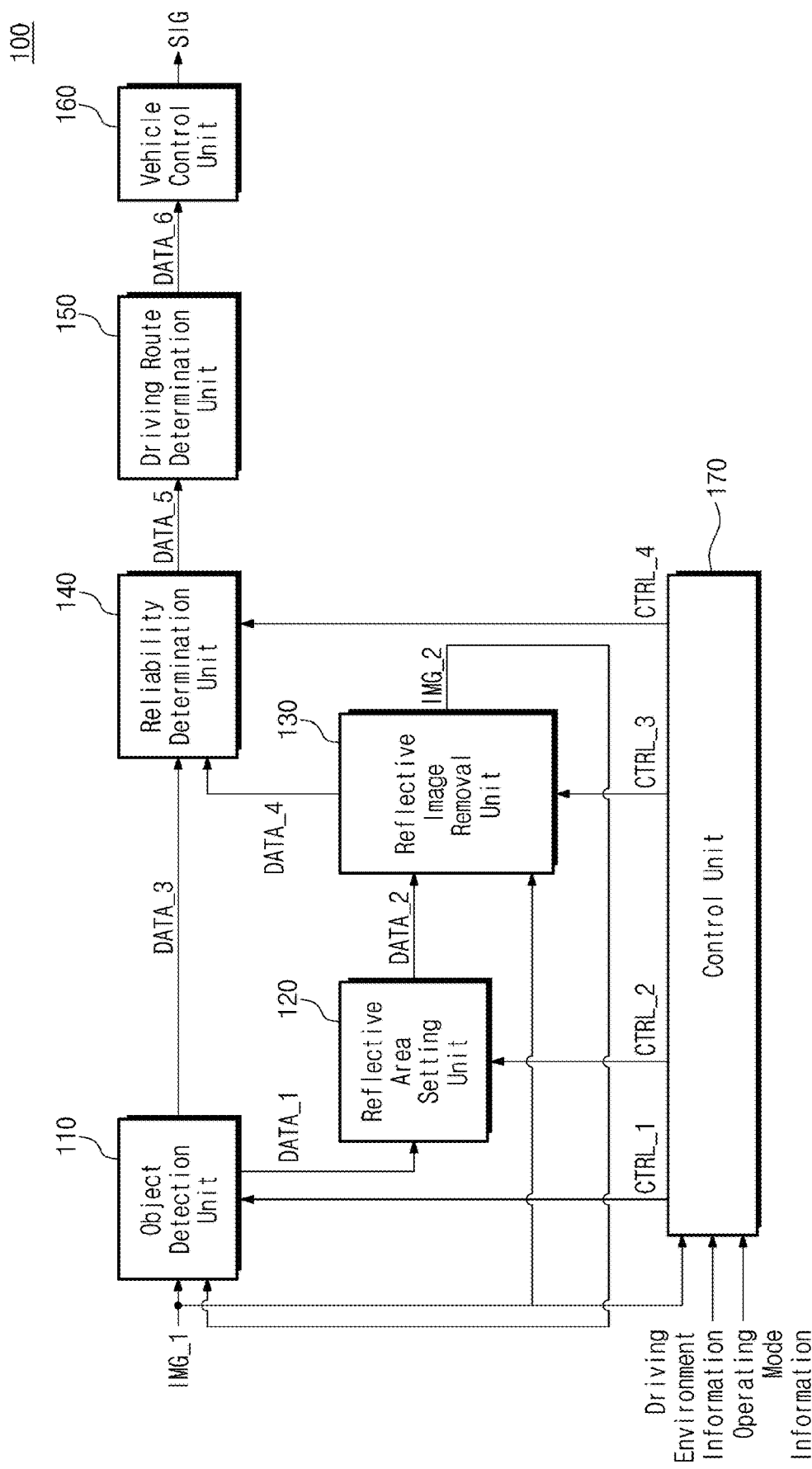
FIG. 2 is a block diagram of a vehicle control apparatus according to an embodiment of the disclosure.

FIG. 2 is a block diagram of a vehicle control apparatus according to an embodiment of the disclosure. Referring to FIG. 2, a vehicle control apparatus 100 may include an object detection unit 110, a reflective area setting unit 120, a reflective image removal unit 130, a reliability determination unit 140, a control unit 170, a driving route determination unit 150, and a vehicle control unit 160.

The vehicle control apparatus 100 may detect an object from a vehicle external image obtained by a camera, and may obtain object information by analyzing the detected object. The vehicle control apparatus 100 may control a vehicle driving apparatus to perform functions such as the speed control, lane change, and emergency stop of a vehicle based on the object information.

The vehicle control apparatus 100 may be implemented with one or more processors. The processor may include at least one of the object detection unit 110, the reflective area setting unit 120, the reflective image removal unit 130, the reliability determination unit 140, the control unit 170, the driving route determination unit 150, and the vehicle control unit 160. When the processor includes the object detection unit 110, the reflective area setting unit 120, the reflective image removal unit 130, the reliability determination unit 140, and the control unit 170, the vehicle control apparatus 100 may be referred to as an "object detection device". In this case, the driving route determination unit 150 and the vehicle control unit 160 may be implemented as a separate processor.

The processor may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

The object detection unit 110 may receive a first vehicle external image IMG_1 from a camera. The object detection unit 110 may perform primary object detection based on the first vehicle external image IMG_1 to obtain first object information, which is information about an object outside a vehicle.

The first vehicle external image IMG_1 may include information about whether an object is present, information about the type of the object, location information of the object, information about a distance between the vehicle and the object, information about the relative speed between the vehicle and the object, and the like. The object may be various objects associated with the driving of the vehicle. For example, the object may include pedestrians, other vehicles, lines, traffic lights, roads, and the like. The object may further include a light source or light emitted from the light source. The light may include light generated from a lamp provided in another vehicle, light generated from a street light, and light emitted from a light source such as sunlight.

When the object is a light source, first object information DATA_1 may include light source information. The object detection unit 110 may detect a light source from the first vehicle external image IMG_1 and may obtain the light source information by analyzing the light source. The light source information may include at least one of location information, size information, brightness information, and color information of the light source.

The object detection unit 110 may provide the first object information DATA_1 to different units depending on a control mode. The control mode may include a caution mode and a normal mode. The control mode relates to the vehicle control apparatus 100 and may be determined by the control unit 170 based on driving environment information and operating mode information. The driving environment information may include at least one of driving time information, driving weather information, and road state information. The operating mode information may include information about whether a vehicle is in an autonomous driving mode or a manual driving mode. The autonomous driving mode may be an operating mode in which a vehicle drives by itself without a user's driving manipulation. The manual driving mode may be an operating mode in which the vehicle drives depending on the user's driving manipulation.

The caution mode may be the control mode in the case where the vehicle is driving autonomously in a specific driving environment. The specific driving environment refers to a driving environment capable of being affected by the reflected light upon detecting an object. For example, the specific driving environment may be a driving environment in rain or snow, or a driving environment at night.

The normal mode may be a control mode other than a caution mode. That is, the normal mode may be a control mode when the vehicle is driving autonomously in a driving environment except for the specific driving environment. Alternatively, the normal mode may be a control mode in the case where the vehicle is manually driving in the specific driving environment.

In the normal mode, the vehicle control apparatus 100 may perform primary object detection on an external image and then may determine a driving route based on the result of the primary object detection. For example, the object detection unit 110 may provide the first object information DATA_1 to the reliability determination unit 140 in the normal mode. In the normal mode, the reliability determination unit 140 may be deactivated. In this case, the reliability determination unit 140 may provide the received first object information DATA_1 to the driving route determination unit 150 as it is. The driving route determination unit 150 may generate the driving route based on the first object information DATA_1.

In the caution mode, the vehicle control apparatus 100 may remove a reflective image included in an external image, may perform secondary object detection based on an image in which the reflective image is removed, and may determine the driving route based on the result of the secondary object detection. For example, the object detection unit 110 may provide the first object information DATA_1 to the reflective area setting unit 120.

The reflective area setting unit 120 may set a first reflective area for the reflected light based on the first object information DATA_1. For example, the reflective area setting unit 120 may detect a road horizontal line from the first vehicle external image IMG_1 and may set the road horizontal line as an axis to calculate the horizontal location of a light source. The horizontal location may be a location where an axis meets a line (hereinafter, a center line) extending vertically from the center of an object. The reflective area setting unit 120 may determine the horizontal location of the first reflective area to correspond to the horizontal location of the light source. The horizontal location of the first reflective area may be a location where the center line of the first reflective area meets the axis. Such the horizontal location of the first reflective area may be corrected depending on the geometric location of the camera mounted on the vehicle with respect to the horizontal location of the light source.

The reflective area setting unit 120 may calculate the width of the light source based on light source information, and then may set the first reflective area of a width that is proportional to the width of the light source. The light source information may include at least one of location information, size information, brightness information, and color information of the light source. The reflective area setting unit 120 may set the first reflective area of a length extending in the first direction from a road horizontal line. The first direction may be a direction facing a vehicle from the road horizontal line. Alternatively, the first direction may be a y-axis direction perpendicular to the road horizontal line.

When the light source is located in the first direction from the road horizontal line, the reflective area setting unit 120 may set the first reflective area with respect to one end in the first direction of the light source. The one end in the first direction of the light source may be an end portion in the first direction in a light source detection area. The light source detection area may be formed in various shapes, as an area for displaying a light source. In this case, the first reflective area may have a length extending in the first direction from one end in the first direction of the light source.

The reflective area setting unit 120 may provide the reflective image removal unit 130 with information DATA_2 about the set first reflective area. The information DATA_2 about the first reflective area may include location information and size information of the first reflective area.

The reflective image removal unit 130 may receive the information DATA_2 about the first reflective area from the reflective area setting unit 120 and then may receive the first vehicle external image IMG_1 from a camera. The reflective image removal unit 130 may generate a second vehicle external image IMG_2, in which the reflective image inside the first reflective area is removed, based on the information DATA_2 about the first reflective area and the first vehicle external image IMG_1. The reflective image may be referred to as a "ghost image". The second vehicle external image IMG_2 in which the reflective image is removed may be referred to as a "ghost-removal image".

The reflective image removal unit 130 may remove a reflective image inside the first reflective area, using pixel values inside the first reflective area. The reflective image may be a set of specific pixels. The specific pixel may mean a pixel having attributes different from those of surrounding pixels. For example, the specific pixel may be a pixel brighter than the surrounding pixels. To detect a specific pixel, the reflective image removal unit 130 may calculate pixel values of pixels within the first reflective area. The pixel value may mean a discrete value indicating the color, contrast, or other attribute information of a pixel.

The reflective image removal unit 130 may generate a cluster corresponding to the reflective image, based on the pixel values. The reflective image removal unit 130 may calculate a reference pixel value based on light source information, and may detect pixels having a pixel value, which is not less than the reference pixel value, from among pixels inside the first reflective area. The reflective image removal unit 130 may generate a cluster by clustering pixels having a pixel value that is not less than the reference pixel value.

The reflective image removal unit 130 may reset the first reflective area, based on the cluster. The reflective image removal unit 130 may reset the first reflective area to a second reflective area having a size smaller than the size of the first reflective area. The reflective image removal unit 130 may calculate the location of the center point of the cluster, the first direction size of the cluster, and the second direction size of the cluster, and may set the second reflective area based on the calculated results.

The second reflective area may have the size more increased by a first setting value in the first direction from the center point location than the first direction size of the cluster. The second reflective area may have the size more increased by a second setting value in the second direction than the second direction size of the cluster. The first setting value may be a preset value and may be the same as or different from the second setting value.

The reflective image removal unit 130 may remove the cluster through replacement within the second reflective area. The second reflective area may be divided into a first area inside the cluster and a second area outside the cluster. The reflective image removal unit 130 may calculate the average value of the second pixel values inside the second area and may replace the first pixel values inside the first area with the average value of the second pixel values.

The reflective image removal unit 130 may provide the object detection unit 110 with the second vehicle external image IMG_2 in which the reflective image is removed through replacement. Besides, the reflective image removal unit 130 may provide the reliability determination unit 140 with information DATA_4 about the second reflective area. The information DATA_4 about the second reflective area may include location information and size information of the second reflective area.

The object detection unit 110 may receive the second vehicle external image IMG_2, in which the reflective image is removed, from the reflective image removal unit 130. The object detection unit 110 may obtain second object information DATA_3 by performing secondary object detection based on the second vehicle external image IMG_2. The second object information DATA_3 may include information about various objects associated with vehicle driving, such as pedestrians, other vehicles, lines, light sources, and the like, which are detected from the second vehicle external image IMG_2. The object detection unit 110 may provide the second object information DATA_3 to the reliability determination unit 140.

The reliability determination unit 140 may determine the reliability of the second object information DATA_3 received from the object detection unit 110. The reliability determination unit 140 may set an object detection area based on the second object information DATA_3, and may detect an overlapping area in which the object detection area and the second reflective area overlap with each other, based on the information DATA_4 about the second reflective area received from the reflective image removal unit 130.

The reliability determination unit 140 may determine the reliability of the second object information DATA_3 by calculating an intersection over union (IoU) value based on the overlapping area. The reliability determination unit 140 may compare the IoU value with a threshold value. When the IoU value is less than the threshold value, the reliability determination unit 140 may determine that the reliability of the second object information DATA_3 is higher than a setting value. The reliability determination unit 140 may compare the IoU value with the threshold value. When the IoU value is greater than the threshold value, the reliability determination unit 140 may determine that the reliability of the second object information DATA_3 is lower than the setting value.

The reliability determination unit 140 may provide third object information DATA_5 to the driving route determination unit 150 depending on the result of determining the reliability. The third object information DATA_5 may be information including the second object information DATA_3 or information obtained by changing the second object information DATA_3.

When determining that the reliability of the second object information DATA_3 is higher than the setting value, the reliability determination unit 140 may provide the second object information DATA_3 to the driving route determination unit 150. In this case, the third object information DATA_5 may include the second object information DATA_3. When determining that the reliability of the second object information DATA_3 is lower than the setting value, the reliability determination unit 140 may provide the driving route determination unit 150 with information obtained by changing the second object information DATA_3. The information obtained by changing the second object information DATA_3 may be information that is obtained by excluding information with low reliability from the second object information DATA_3, or is changed to other information.

The driving route determination unit 150 may generate a driving route, based on the third object information DATA_5 including at least part of the second object information DATA_3. The driving route determination unit 150 may further use vehicle location data and navigation information upon generating the driving route. The driving route determination unit 150 may provide the vehicle control unit 160 with information DATA_6 about the generated driving route.

The vehicle control unit 160 may generate a vehicle driving signal SIG such that a vehicle autonomously drives along the driving route, based on the information DATA_6 about the driving route. The vehicle control unit 160 may control autonomous driving of the vehicle, by providing a vehicle driving signal SIG to at least one of a vehicle driving device, a vehicle braking device, and a vehicle steering device.

According to an embodiment, the vehicle control unit 160 may be integrated with the driving route determination unit 150. In this case, the vehicle control unit 160 may generate a driving route based on the third object information DATA_5, and may control the autonomous driving of the vehicle along the driving route.

The control unit 170 may control the overall operation of the vehicle control apparatus 100. The control unit 170 may control the operation of a processor inside the vehicle control apparatus 100. For example, the control unit 170 may control the operations of the object detection unit 110, the reflective area setting unit 120, the reflective image removal unit 130, and the reliability determination unit 140.

The control unit 170 may control the vehicle control apparatus 100 to enter a caution mode, based on driving environment information and operating mode information. The control unit 170 may obtain driving environment information through a camera, a sensor, or a communication device. The driving environment information may include at least one of driving time information, driving weather information, and road state information. The control unit 170 may obtain the operating mode information through a user interface device. The operating mode may include an autonomous driving mode, a manual driving mode, or the like.

The control unit 170 may determine whether the vehicle is driving in the specific driving environment, and whether the vehicle is autonomously driving, based on the driving environment information and the operating mode information. The specific driving environment may be a driving environment affected by the reflected light upon detecting an object. The autonomous driving mode may be an operating mode in which the vehicle drives based on its own determination without a user's driving manipulation. When determining that the vehicle is autonomously driving in the specific driving environment, the control unit 170 may control the vehicle to enter a caution mode.

In a caution mode, the control unit 170 may activate the reflective area setting unit 120, the reflective image removal unit 130, and the reliability determination unit 140. In the normal mode, the control unit 170 may deactivate the reflective area setting unit 120, the reflective image removal unit 130, and the reliability determination unit 140. In this case, the reliability determination unit 140 may transmit the second object information DATA_3 received from the object detection unit 110, to the driving route determination unit 150 as it is.

The control unit 170 may provide the object detection unit 110 with a first control signal CTRL_1 for controlling the entry into the caution mode. The object detection unit 110 may provide the first object information DATA_1 to the reflective area setting unit 120 in response to the first control signal CTRL_1.

The control unit 170 may determine that the driving environment of the vehicle is not the specific driving environment, or may determine that the operating mode of the vehicle is not an autonomous driving mode, based on the driving environment information and the operating mode information. In this case, the object detection unit 110 may provide the first object information DATA_1 to the reliability determination unit 140 depending on a normal mode. In the normal mode, the reliability determination unit 140 may provide the first object information DATA_1 to the driving route determination unit 150 as it is.

To enter the caution mode, the control unit 170 may provide a second control signal CTRL_2 to the reflective area setting unit 120. The reflective area setting unit 120 may be activated in response to the second control signal CTRL_2. For example, the reflective area setting unit 120 may set the first reflective area in response to the second control signal CTRL_2.

To enter the caution mode, the control unit 170 may provide the third control signal CTRL_3 to the reflective image removal unit 130. The reflective image removal unit 130 may be activated in response to the third control signal CTRL_3. For example, the reflective image removal unit 130 may set the second reflective area or may remove the reflective image, in response to the third control signal CTRL_3.

To enter the caution mode, the control unit 170 may provide a fourth control signal CTRL_4 to the reliability determination unit 140. The reliability determination unit 140 may be activated in response to the fourth control signal CTRL_4. For example, the reliability determination unit 140 may determine the reliability of the second object information DATA_3 in response to the fourth control signal CTRL_4.

Figure 3:
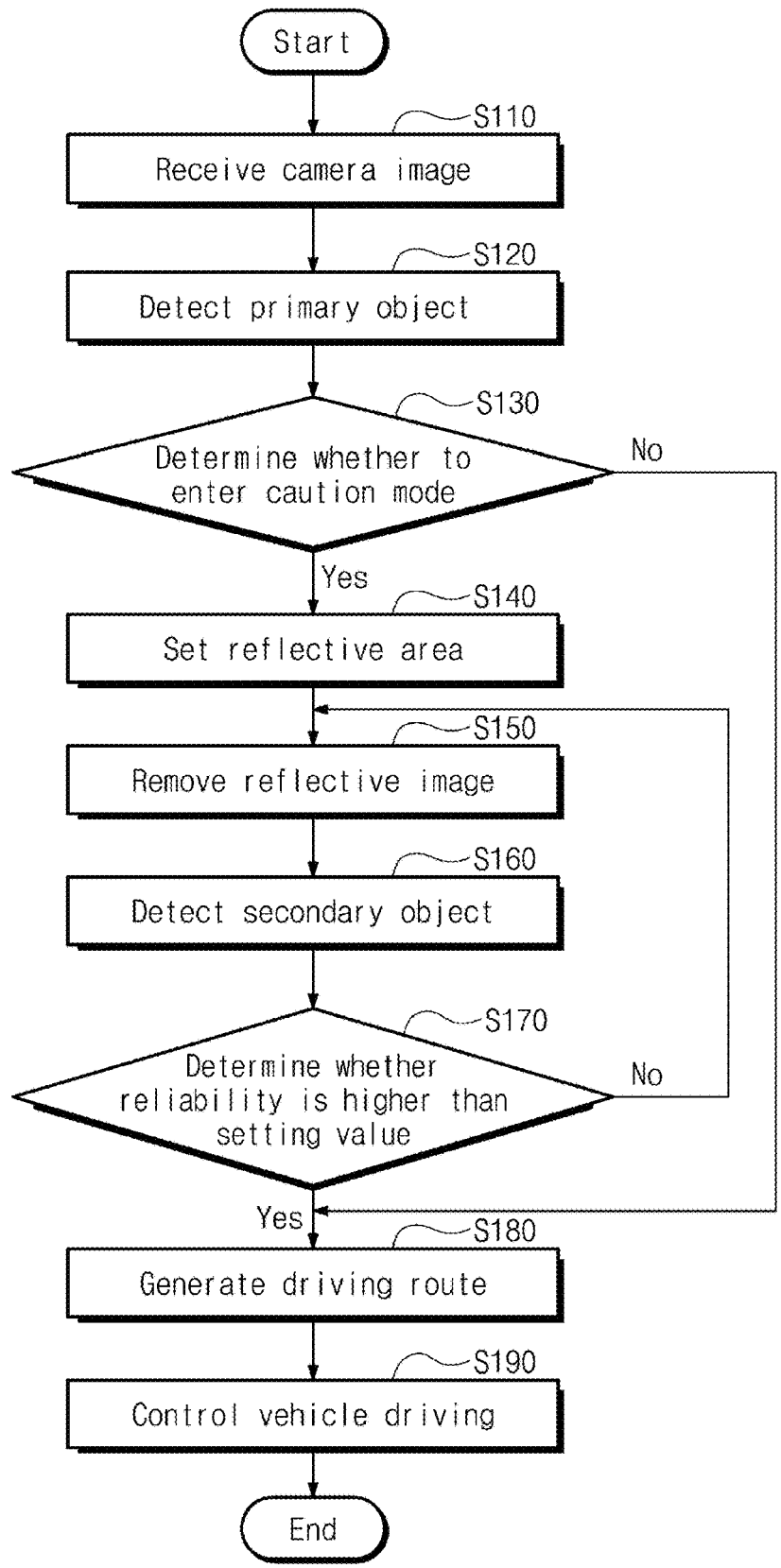
FIG. 3 is a flowchart illustrating an operating method of the vehicle control apparatus according to FIG. 2.

FIG. 3 is a flowchart illustrating an operating method of the vehicle control apparatus according to FIG. 2. Referring to FIGS. 2 and 3, the vehicle control apparatus 100 may include the object detection unit 110, the reflective area setting unit 120, the reflective image removal unit 130, the reliability determination unit 140, the control unit 170, the driving route determination unit 150, and the vehicle control unit 160. It may be understood that the operation of each unit described below is the operation of the vehicle control apparatus 100.

In operation S110, the vehicle control apparatus 100 may receive a camera image. For example, the object detection unit 110 of the vehicle control apparatus 100 may include the first vehicle external image IMG_1.

In operation S120, the vehicle control apparatus 100 may perform primary object detection. For example, the object detection unit 110 of the vehicle control apparatus 100 may obtain the first object information DATA_1 based on the first vehicle external image IMG_1. The first object information DATA_1 may include light source information. The light source information may include at least one of location information, size information, brightness information, and color information of the light source.

In operation S130, the vehicle control apparatus 100 may determine whether to enter a caution mode. For example, the control unit 170 of the vehicle control apparatus 100 may determine whether to enter the caution mode, through driving environment information and operating mode information. The operating mode may include an autonomous driving mode and a manual driving mode. When determining that a vehicle in an autonomous driving mode is in a specific driving environment, the control unit 170 may enter the caution mode.

When determining that the vehicle is not in the specific driving environment, the control unit 170 may not generate a signal for entering the caution mode. In this case, the vehicle control apparatus 100 may generate a driving route based on the first object information DATA_1 and may control the driving of the vehicle, depending on the normal mode.

When it is determined that the vehicle enters the caution mode, in operation S140, the vehicle control apparatus 100 may set the first reflective area for the reflected light, based on the first object information DATA_1. For example, the reflective area setting unit 120 of the vehicle control apparatus 100 may set the first reflective area by detecting a road horizontal line. The detailed descriptions about an operation of setting the first reflective area will be described later in FIGS. 4A and 4B. The reflective area setting unit 120 may provide the reflective image removal unit 130 with information DATA_2 about the first reflective area.

In operation S150, the vehicle control apparatus 100 may remove the reflective image based on the information DATA_2 about the first reflective area. For example, the reflective image removal unit 130 of the vehicle control apparatus 100 may generate a cluster corresponding to the reflective image through clustering, may set the second reflective area smaller than the first reflective area, and may remove the cluster through replacement within the second reflective area. The detailed descriptions about an operation of removing a reflective image will be described later in FIG. 5. The reflective image removal unit 130 may generate the second vehicle external image IMG_2 in which the reflective image is removed, and may provide the second vehicle external image IMG_2 to the object detection unit 110.

In operation S160, the vehicle control apparatus 100 may perform secondary object detection based on the second vehicle external image IMG_2. For example, the object detection unit 110 of the vehicle control apparatus 100 may obtain the second object information DATA_3 through secondary object detection. The second object information DATA_3 may be information about objects outside the vehicle, in which the reflected light is removed. The object detection unit 110 may provide the second object information DATA_3 to the reliability determination unit 140.

In operation S170, the vehicle control apparatus 100 may determine the reliability of the second object information DATA_3. For example, the reliability determination unit 140 of the vehicle control apparatus 100 may determine the reliability of the second object information DATA_3 through an IoU value for an overlapped area of an object detection area and the second reflective area. The detailed descriptions about an operation of determining reliability will be described later in FIG. 8.

When it is determined that the reliability of the second object information DATA_3 is lower than a setting value, the reflective image removal unit 130 may set a third reflective area smaller than the second reflective area. Similarly to operation S150, the reflective image removal unit 130 may remove the reflective image in the third reflective area.

When it is determined that the reliability of the second object information DATA_3 is higher than the setting value, in operation S180, the vehicle control apparatus 100 may generate a driving route based on the second object information DATA_3.

In operation S190, the vehicle control apparatus 100 may control the vehicle driving device such that the vehicle drives autonomously along the driving route generated by the driving route determination unit 150.

Figure 4A:
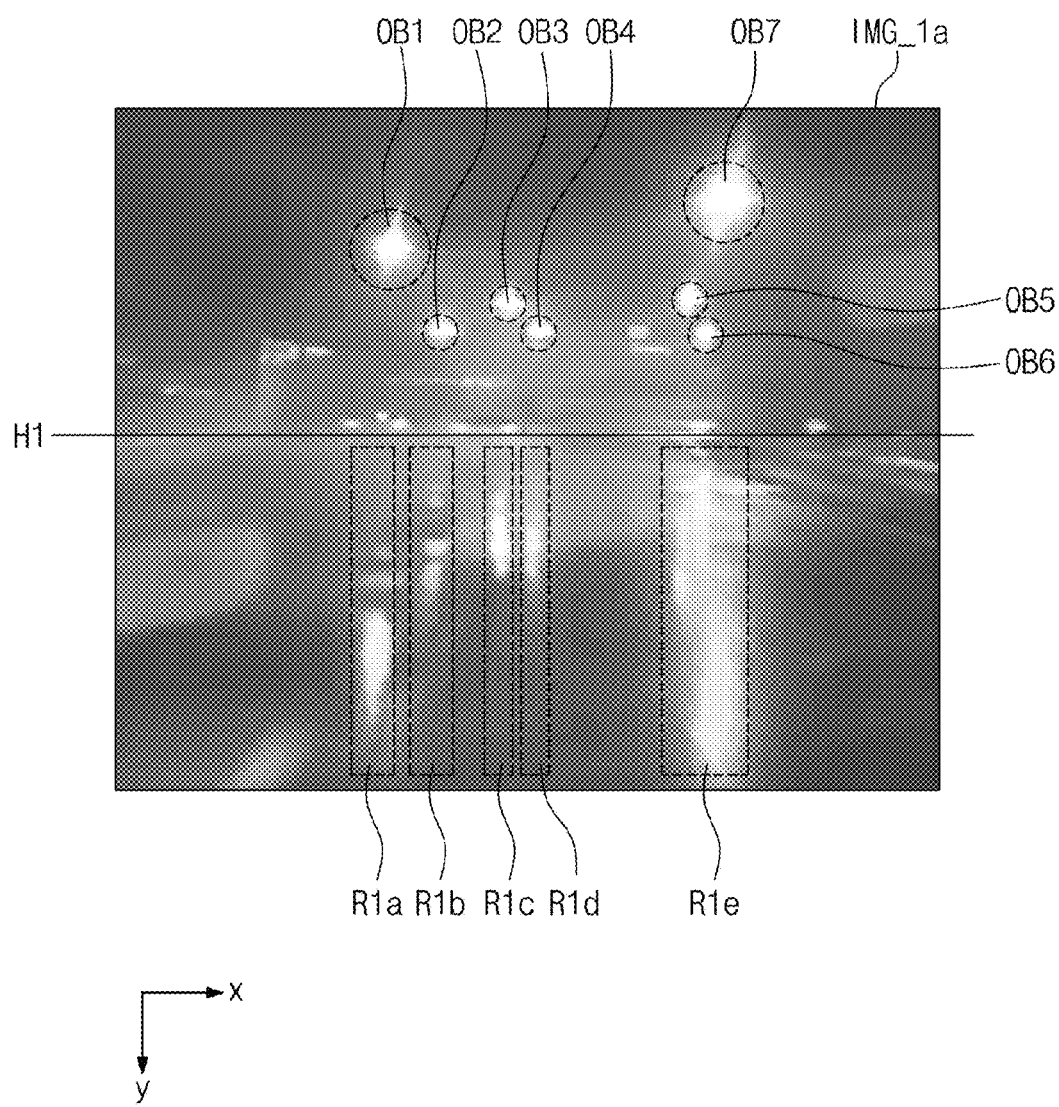
FIGS. 4A and 4B are views illustrating reflective areas set according to FIG. 3.
Figure 4B:
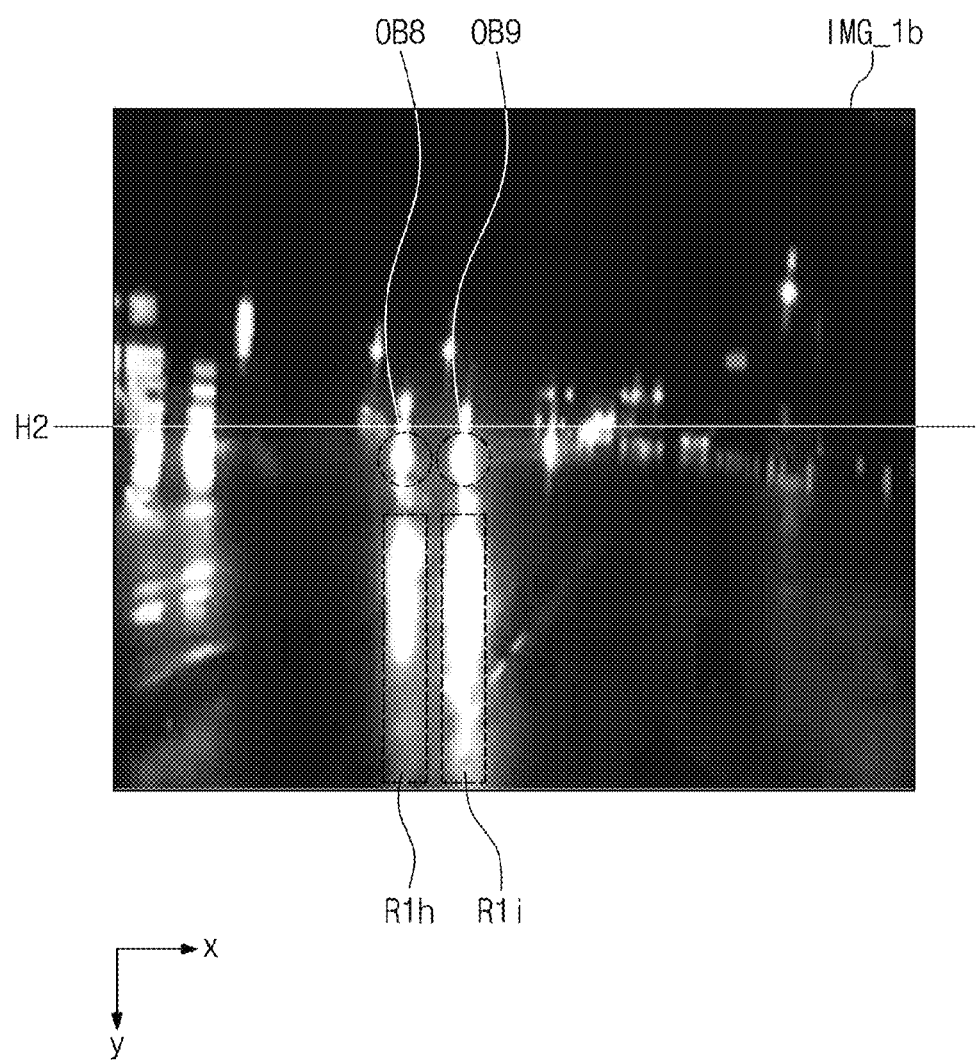

FIGS. 4A and 4B are views illustrating reflective areas set according to FIG. 3. Referring to FIGS. 2 to 4A, the object detection unit 110 may detect first to seventh light sources OB1 to OB7 in a first vehicle external image IMG_1a. The object detection unit 110 may obtain light source information about the first to seventh light sources OB1 to OB7. The light source information may include at least one of location information, size information, brightness information, and color information of each of the first to seventh light sources OB1 to OB7.

The reflective area setting unit 120 may set 1a-th to 1e-th reflective areas R1a to R1e, based on information about the first to seventh light sources OB1 to OB7. The 1a-th to 1e-th reflective areas R1a to R1e may mean areas in each of which a reflective image may be formed by the first to seventh light sources OB1 to OB7. The 1a-th to 1e-th reflective areas R1a to R1e may be changed depending on information about the first to seventh light sources OB1 to OB7, and a camera location.

The reflective area setting unit 120 may set the 1a-th to 1e-th reflective areas R1a to R1e respectively corresponding to the first to seventh light sources OB1 to OB7. At this time, some of the 1a-th to 1e-th reflective areas R1a to R1e may overlap with one another. The reflective area setting unit 120 may set the overlapped first reflective areas as a single integrated reflective area. For example, the fifth light source OB5, the sixth light source OB6, and the seventh light source OB7 may overlap with one another in the y-axis direction, and the first reflective areas corresponding thereto may also overlap with one another. In this case, the reflective area setting unit 120 may set the single integrated 1e-th reflective area R1e. Hereinafter, the 1e-th reflective area R1e refers to the single integrated 1e-th reflective area R1e obtained by integrating the first reflective area corresponding to the fifth light source OB5, the first reflective area corresponding to the sixth light source OB6, and the first reflective area corresponding to the seventh light source OB7.

The reflective area setting unit 120 may detect a road horizontal line H1 from the first vehicle external image IMG_1a and may set the road horizontal line H1 as an axis. In the embodiment of FIG. 4A, the road horizontal line H1 may be parallel to the x-axis. In this case, the horizontal location of a light source may be the point at which a line hereinafter, a "center line" extending in the vertical direction (y-axis direction) from each center of the first to seventh light sources OB1 to OB7 is intersected with the x-axis or the road horizontal line H1. The horizontal location of the 1a-th to 1e-th reflective areas R1a to R1e may be a point at which each center line of the 1a-th to 1e-th reflective areas R1a to R1e is intersected with the x-axis or the road horizontal line H1. The horizontal location of each of the 1a-th to 1e-th reflective areas R1a to R1e may correspond to the horizontal location of each of the first to seventh light sources OB1 to OB7, and may be corrected depending on the geometric location of a camera mounted on a vehicle with respect to the horizontal location of each of the first to seventh light sources OB1 to OB7.

The width of each of the 1a-th to 1e-th reflective areas R1a to R1e may be proportional to the width of each of the first to seventh light sources OB1 to OB7. The length of each of the 1a-th to 1e-th reflective areas R1a to R1e may extend in the first direction from the road horizontal line H1. The first direction may be a direction facing the vehicle from the road horizontal line H1. Alternatively, the first direction may be the y-axis direction.

Referring to FIG. 4B, the object detection unit 110 may detect an eighth light source OB8 and a ninth light source OB9, which are located in the first direction with respect to a road horizontal line H2, from a first vehicle external image IMG_1b. When a light source is located in the first direction from the road horizontal line H2, the first reflective area may be set from one end in the first direction of the light source. The one end in the first direction of the light source may be an end portion in the first direction in a light source detection area. The light source detection area is an area for displaying a light source, and has a circular shape according to FIG. 4B, but the shape of the light source detection area is not limited thereto.

For example, the 1h-th reflective area R1h may be set from one end of the eighth light source OB8. The length of the 1h-th reflective area R1h may extend in the first direction from one end of the eighth light source OB8. The 1i-th reflective area R1i may be set from one end of the ninth light source OB9. The length of the 1i-th reflective area R1i may extend in the first direction from one end of the ninth light source OB9.

The width of each of the 1h-th and 1i-th reflective areas R1h and R1i may be proportional to the width of each of the 8th and 9th light sources OB8 and OB9.

Figure 5:
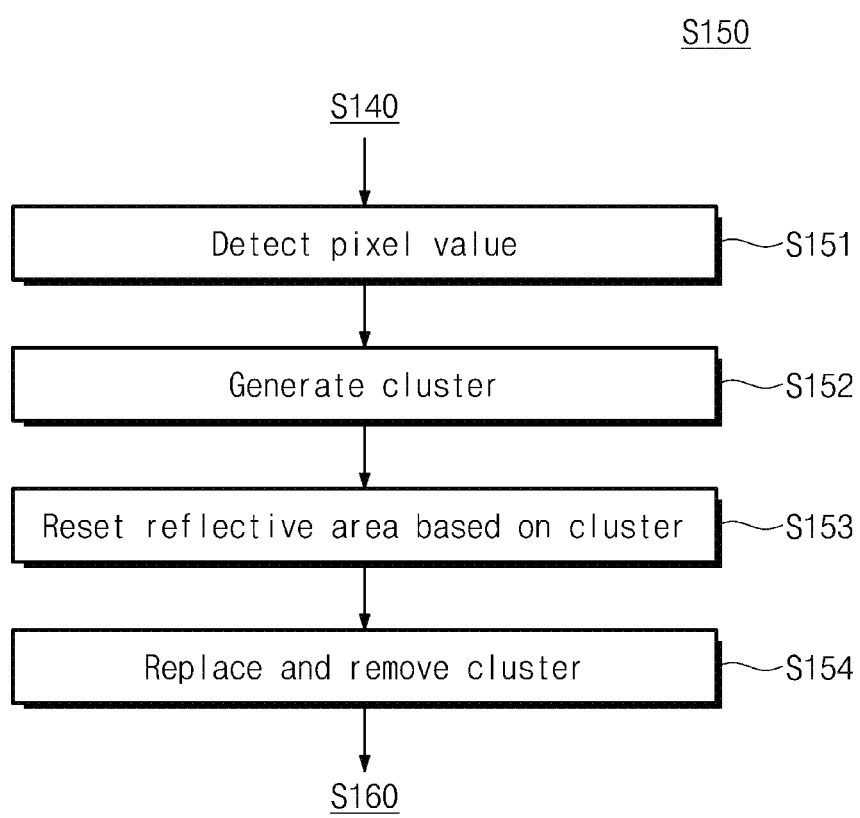
FIG. 5 is a flowchart illustrating an operation of removing a reflective image according to FIG. 3.

FIG. 5 is a flowchart illustrating an operation of removing a reflective image according to FIG. 3. Referring to FIGS. 2, 3, and 5, operation S150 of removing a reflective image may include operation S151 of detecting a pixel value, operation S152 of generating a cluster, operation S153 of resetting a reflective area, and operation S154 of replacing a cluster.

In operation S151, the vehicle control apparatus 100 may detect pixel values of pixels inside the first reflective area based on the information DATA_2 about the first reflective area. For example, the pixel value may be the brightness value of the corresponding pixel. The reflective image removal unit 130 of the vehicle control apparatus 100 may obtain a brightness value with respect to all pixels inside the first reflective area. Alternatively, the reflective image removal unit 130 may obtain the brightness value with respect to pixels belonging to a predetermined range within the first reflective area. In this case, the control unit 170 may provide the reflective image removal unit 130 with a control signal for detecting a pixel value with respect to a predetermined range.

In operation S152, the vehicle control apparatus 100 may generate a cluster, using the pixel values detected in operation S151. For example, the reflective image removal unit 130 of the vehicle control apparatus 100 may set a reference pixel value based on light source information, may detect pixels having a pixel value, which is not less than the reference pixel value, and may generate a cluster. For example, the cluster may be a set of pixels having a brightness value, which is not less than the reference brightness value, within the first reflective area. In this case, the cluster may correspond to a reflective image.

In operation S153, the vehicle control apparatus 100 may reset the first reflective area based on the cluster. The reset first reflective area may be referred to as a "second reflective area". The size of the second reflective area may be smaller than the size of the first reflective area. For example, the reflective image removal unit 130 of the vehicle control apparatus 100 may set the second reflective area based on the center point location of the cluster, the first direction size of the cluster, and the second direction size of the cluster.

In operation S154, the vehicle control apparatus 100 may remove the cluster through replacement. The second reflective area may be divided into a first area inside the cluster and a second area outside the cluster. For example, the reflective image removal unit 130 of the vehicle control apparatus 100 may calculate the average value of second pixel values inside the second area, and may replace first pixel values inside the first area with the average value of the second pixel values.

Figure 6A:
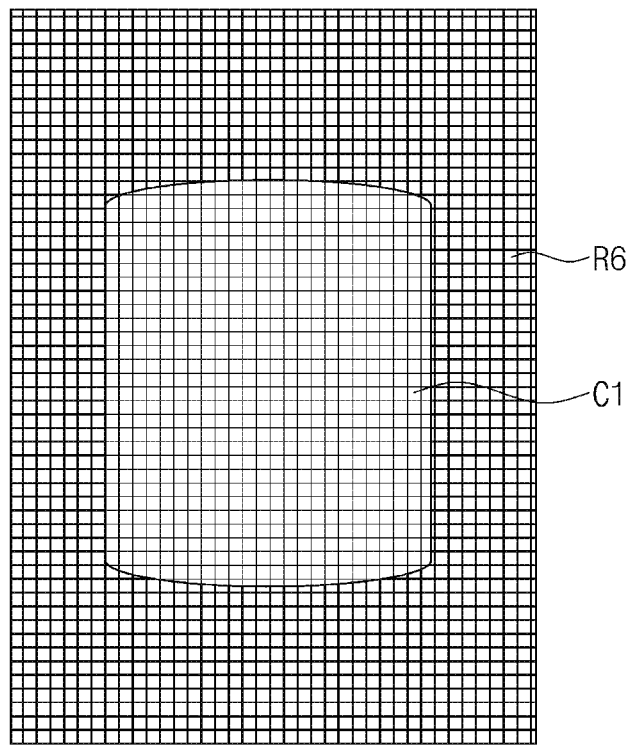
FIGS. 6A to 7B are diagrams illustrating an example of an operation of removing a reflective image according to FIG. 5.

FIGS. 6A to 7B are diagrams illustrating an example of an operation of removing a reflective image according to FIG. 5. Referring to FIGS. 5 and 6A, a first cluster C1 may be present within a first reflective area R6. The first cluster C1 may be a set of pixels having a brightness value, which is not less than a reference brightness value, from among pixels within the first reflective area R6. The reflective image removal unit 130 may generate the first cluster C1 by clustering pixels having a brightness value that is not less than the reference brightness value. In this case, the scheme such as K-means clustering, or the like may be used. Referring to FIG. 6B, second and third clusters C2 and C3 may be generated within a first reflective area R7.

Figure 7A:
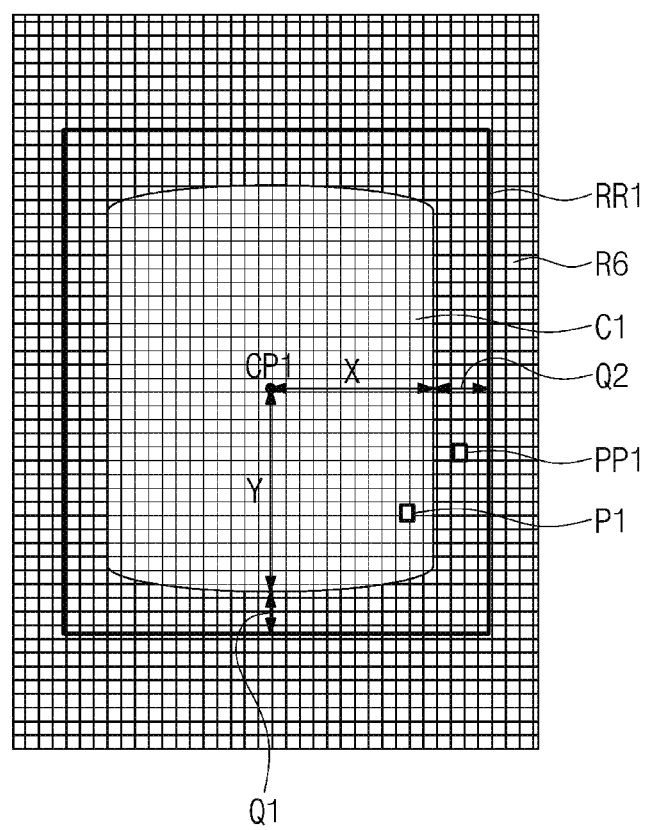

Referring to FIGS. 6A and 7A, the first cluster C1 may have a first direction size (Y) in a first direction and a second direction size (X) in a second direction, from a center point CP1 of the first cluster C1. The reflective image removal unit 130 may set a second reflective area RR1 having a size more increased by a first setting value Q1 in the first direction from the center point CP1 than the first direction size (Y). The reflective image removal unit 130 may set the second reflective area RR1 having a size more increased by a second setting value Q2 in the second direction from the center point CP1 than the second direction size (X).

The second reflective area RR1 may be set to a size smaller than the first reflective area R6. The second reflective area RR1 may include the cluster C1. The reflective image removal unit 130 may set the optimal second reflective area RR1 by adjusting the first setting value Q1 and the second setting value Q2.

The reflective image removal unit 130 may replace a value of a pixel P1 inside the cluster C1 with a value of a pixel PP1, which is positioned outside the cluster C1 and inside the second reflective area RR1. Alternatively, the reflective image removal unit 130 may replace the value of the pixel P1 inside the cluster C1 with the average value of the pixels, which are positioned outside the cluster C1 and inside the second reflective area RR1.

Figure 6B:
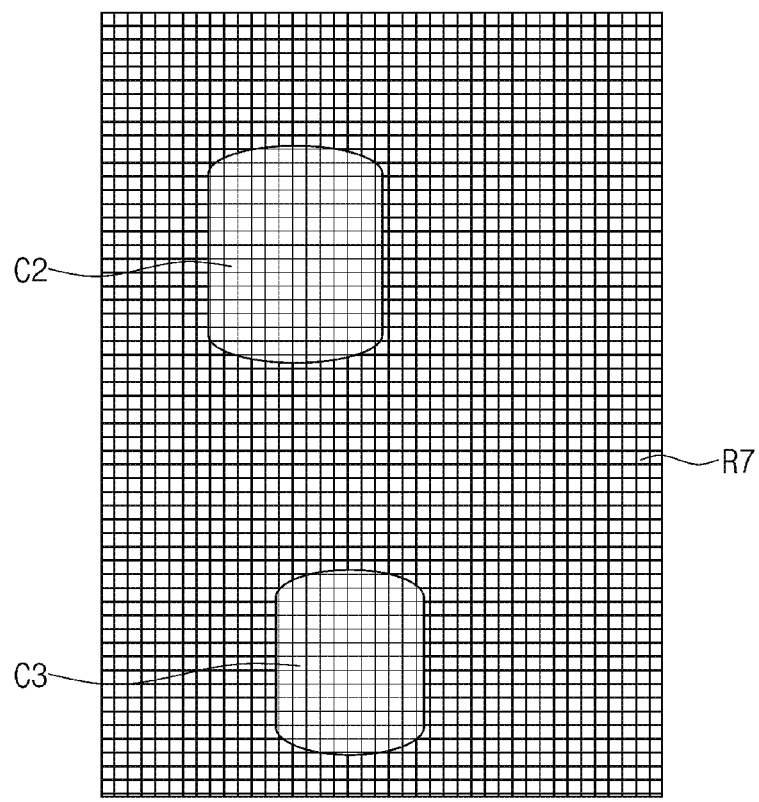
Figure 7B:
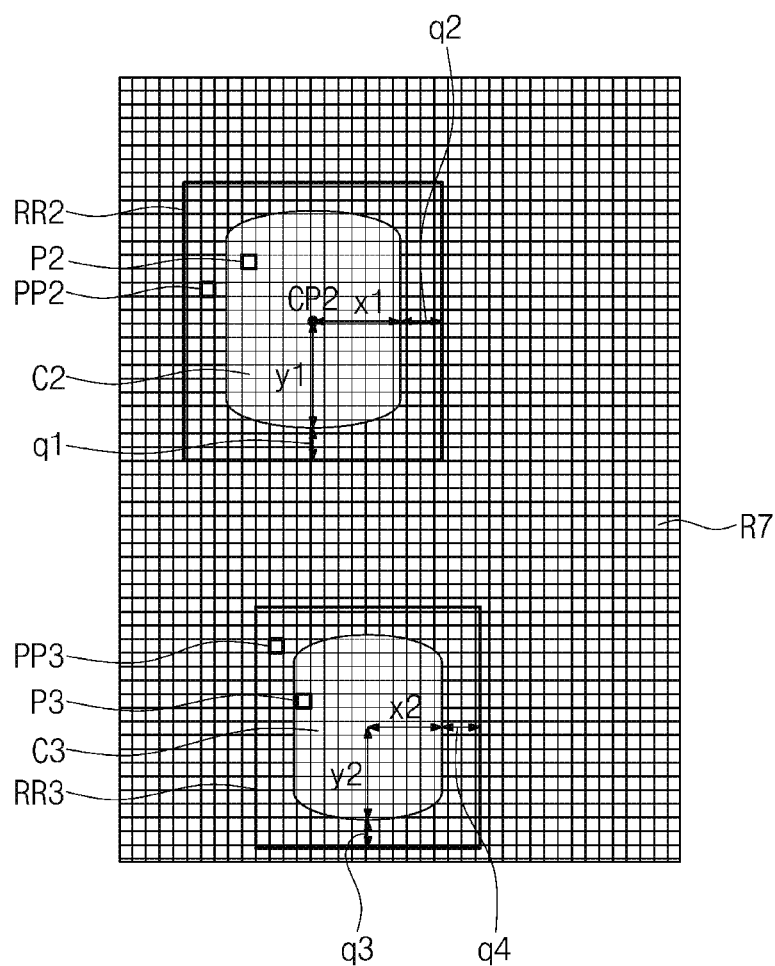

Referring to FIGS. 6B and 7B, a second reflective area RR2 may be set based on the second cluster C2. The second reflective area RR2 may have the size more increased by a third setting value q1 in the first direction from the reference point CP2 of the second cluster C2 than the size y1 of the second cluster C2. The second reflective area RR2 may have the size more increased by a fourth setting value q2 in the second direction from the reference point CP2 of the second cluster C2 than the size x1 of the second cluster C2. The second cluster C2 may be removed by replacing the internal pixel P2 with the external pixel PP2.

Similarly to the description about the second reflective area RR2, the third reflective area RR3 may be set based on the third cluster C3, and the third cluster C3 may be removed by replacing an internal pixel P3 with an external pixel PP3.

The reflective image removal unit 130 may perform an individual reflective image removal operation on each of the plurality of clusters C2 and C3. Except for including the plurality of clusters C2 and C3, the description about FIG. 7B is similar to that of FIG. 7A, and thus the detailed description is omitted.

Figure 8:
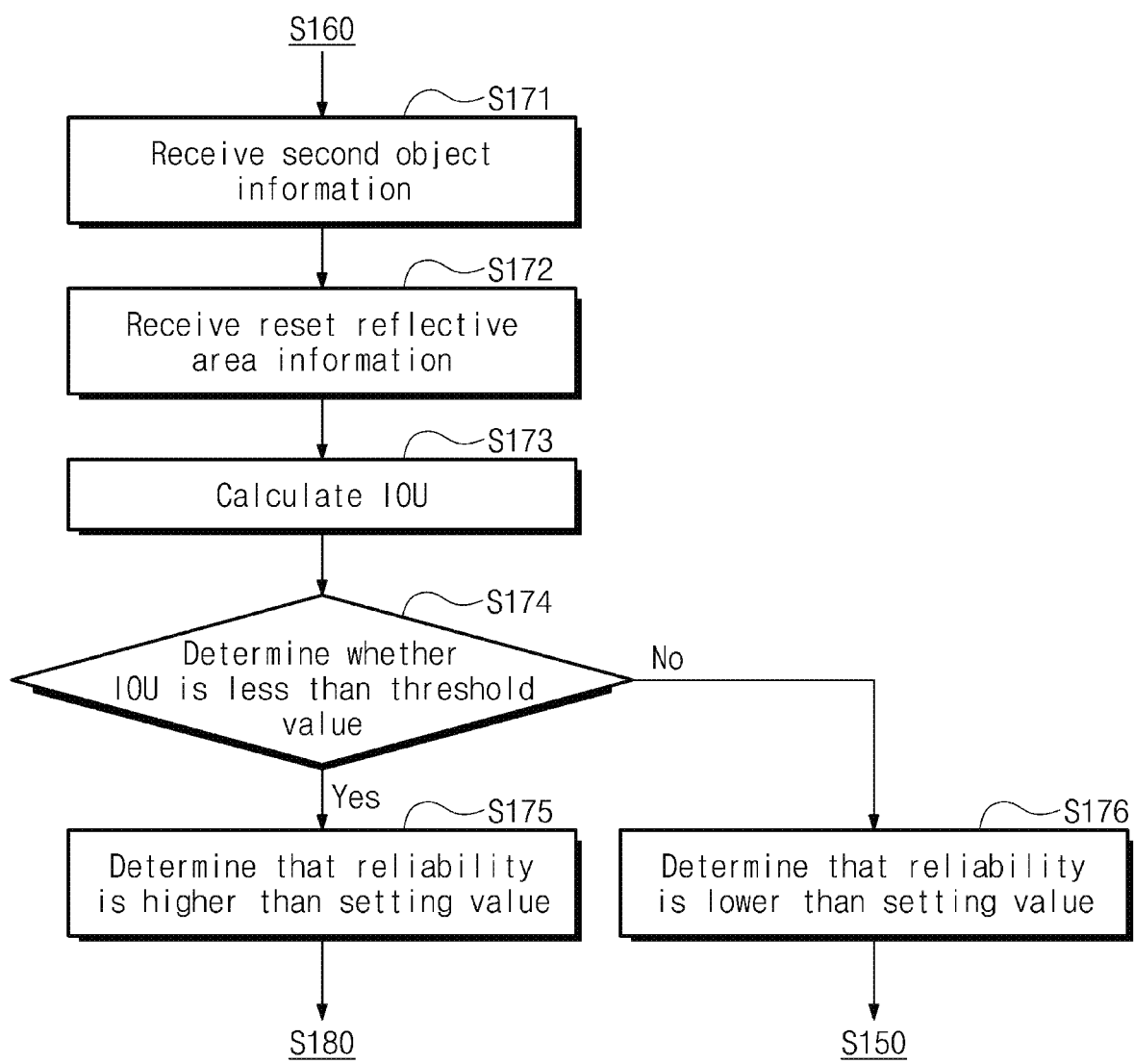
FIG. 8 is a flowchart illustrating the operation of determining reliability according to FIG. 3.

FIG. 8 is a flowchart illustrating the operation of determining reliability according to FIG. 3. Referring to FIGS. 2, 3, and 8, operation S170 of determining reliability may include operation S171 of receiving second object information, operation S172 of receiving reset reflective area information, operation S173 of calculating an IoU value, operation S174 of comparing an IoU value with a threshold value, and operation S175 or S176 of a reliability determination result.

In operation S171, the vehicle control apparatus 100 may obtain the second object information DATA_3. For example, the reliability determination unit 140 of the vehicle control apparatus 100 may receive the second object information DATA_3 from the object detection unit 110.

In operation S172, the vehicle control apparatus 100 may obtain the information DATA_4 about the second reflective area. For example, the reliability determination unit 140 of the vehicle control apparatus 100 may receive the information DATA_4 about the second reflective area from the reflective image removal unit 130. The sequence of operation S171 and operation S172 is not limited to FIG. 8.

In operation S173, the vehicle control apparatus 100 may calculate an IoU value. For example, the reliability determination unit 140 of the vehicle control apparatus 100 may set an object detection area based on the second object information DATA_3 and may detect an overlapping area between the object detection area and the second reflective area. The overlapping area refers to an intersection area between the object detection area and the second reflective area. The IoU value indicates a value obtained by dividing the overlapping area by a union area of the object detection area and the second reflective area.

In operation S174, the vehicle control apparatus 100 may determine whether the IoU value is less than the threshold value, by comparing the IoU value with the threshold value. When the IoU value is less than the threshold value, in operation S175, the vehicle control apparatus 100 may determine that the reliability of the second object information DATA_3 is higher than a setting value. In this case, the vehicle control apparatus 100 may generate a driving route based on the second object information DATA_3.

When the IoU value is greater than the threshold value, in operation S176, the vehicle control apparatus 100 may determine that the reliability of the second object information DATA_3 is lower than the setting value. In this case, the vehicle control apparatus 100 may set a third reflective area having a size smaller than the second reflective area and may again perform an operation of removing the reflective image again based on the third reflective area. Because the distortion is smaller upon removing the reflective image as the reflective area is smaller, the vehicle control apparatus 100 may increase the accuracy or reliability of object detection by setting a smaller reflective area.

When determining that the reliability of the second object information DATA_3 is lower than the setting value, the vehicle control apparatus 100 may repeatedly remove the reflective image and may repeatedly determine the reliability of object information, while resetting the reflective area to a smaller size. According to the embodiment, the control unit 170 may set a repetition count or a repetition time. When the repetition count or repetition time is exceeded, the reliability determination unit 140 may provide the changed second object information to the driving route determination unit 150. The changed second object information may be information obtained excluding information of which the reliability is lower than the setting value, or information replaced with other information. According to the embodiment, when the repetition count or repetition time is exceeded, the reliability determination unit 140 may generate a manual driving request signal.

Figure 9A:
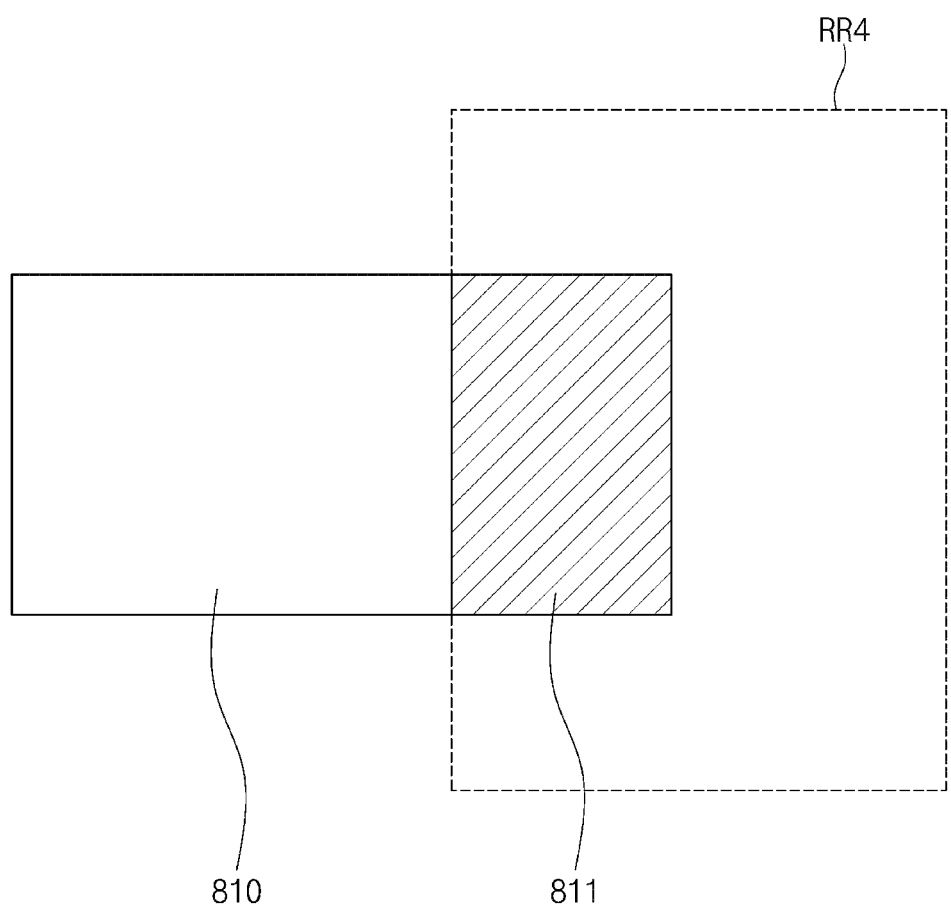
FIGS. 9A to 9C are diagrams illustrating an embodiment of an operation of determining reliability according to FIG. 8.
Figure 9B:
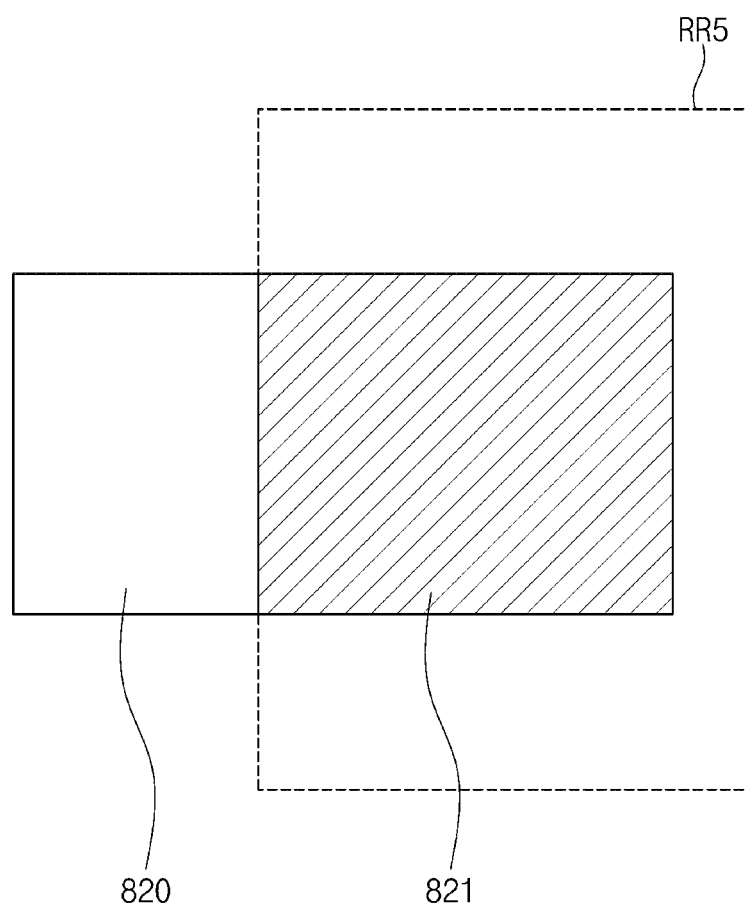
Figure 9C:
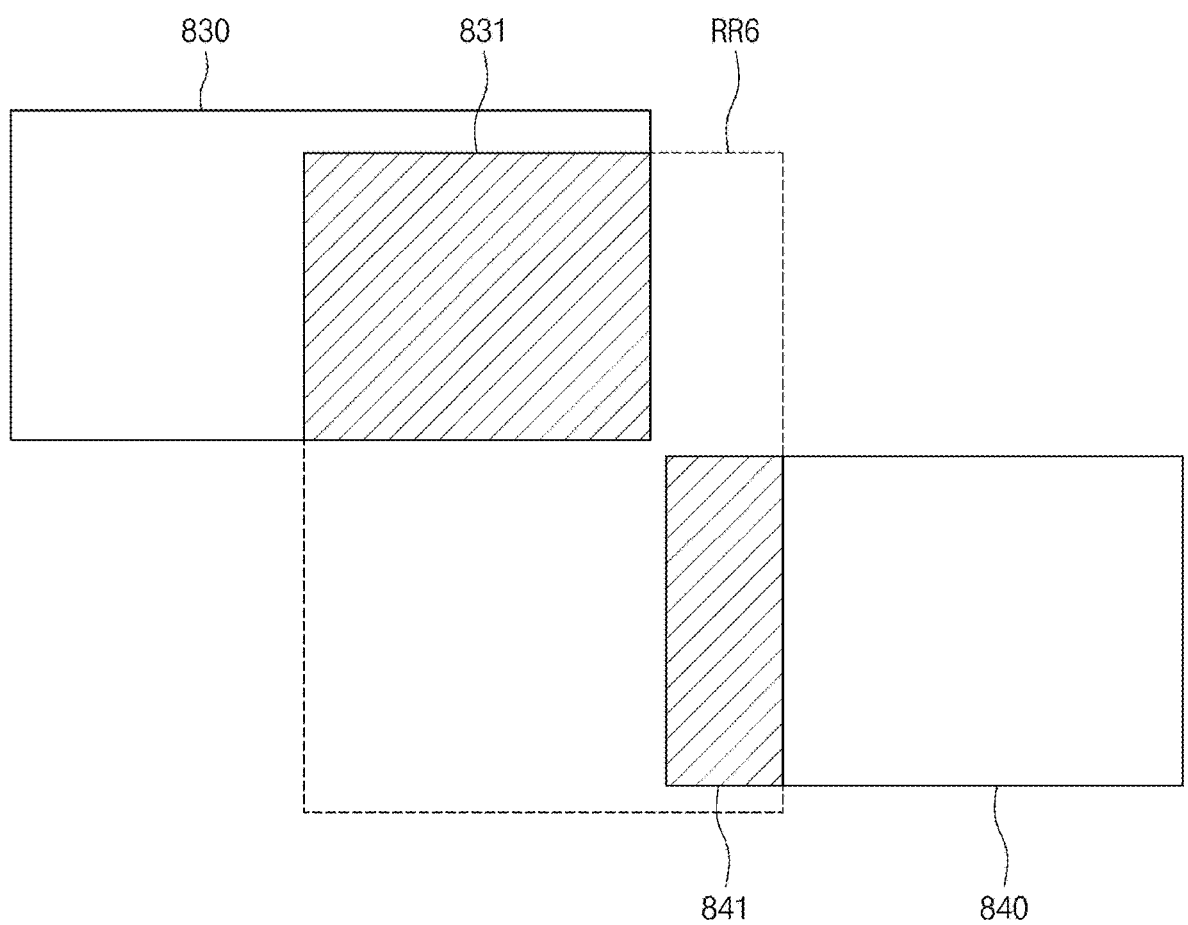

FIGS. 9A to 9C are diagrams illustrating an embodiment of an operation of determining reliability according to FIG. 8. Referring to FIGS. 8 and 9A, a first overlapping area 811 may be an area where an object detection area 810 overlaps with a second reflective area RR4. An IoU value may be calculated by dividing an intersection area between the object detection area 810 and the second reflective area RR4 by a union area of the object detection area 810 and the second reflective area RR4. In the case of FIG. 9A, the reliability determination unit 140 may determine that the IoU value is smaller than a threshold value.

When the IoU value is less than the threshold value, the accuracy of object detection may not be affected a lot by the first overlapping area 811. In other words, the reliability for object information may be increased.

Referring to FIGS. 8 and 9B, a second overlapping area 821 may be an area where an object detection area 820 overlaps with a second reflective area RR5. An IoU value may be calculated by dividing an intersection area between the object detection area 820 and the second reflective area RR5 by a union area of the object detection area 820 and the second reflective area RR5. In the case of FIG. 9B, the reliability determination unit 140 may determine that the IoU value is greater than the threshold value.

When the IoU value is greater than the threshold value, the accuracy of object detection may be greatly affected by the second overlapping area 821. In other words, the reliability for object information may be decreased.

FIGS. 8 and 9C, a plurality of overlapping areas 831 and 841 may be formed in a single second reflective area RR6. The reliability determination unit 140 may determine the number of overlapping areas 831 and 841, and may individually calculate the IoU value with respect to each overlapping area 831 or 841. The description about FIG. 9C is similar to the description about FIG. 9A or 9B except for including the plurality of overlapping areas 831 and 841, and thus the detailed description will be omitted.

In the case of FIG. 9C, the reliability determination unit 140 may determine that the IoU value for the third overlapping area 831 is greater than the threshold value, and may determine that the IoU value for the fourth overlapping area 841 is smaller than the threshold value. The reliability determination unit 140 may provide the driving route determination unit 150 with the third object information DATA_5 excluding object information about the third overlapping area 831. Alternatively, the reliability determination unit 140 may provide the driving route determination unit 150 with the third object information DATA_5 obtained by replacing the object information for the third overlapping area 831 with other information. Here, the other information may be specific information indicating "undetectable" or "caution".

Figure 10:
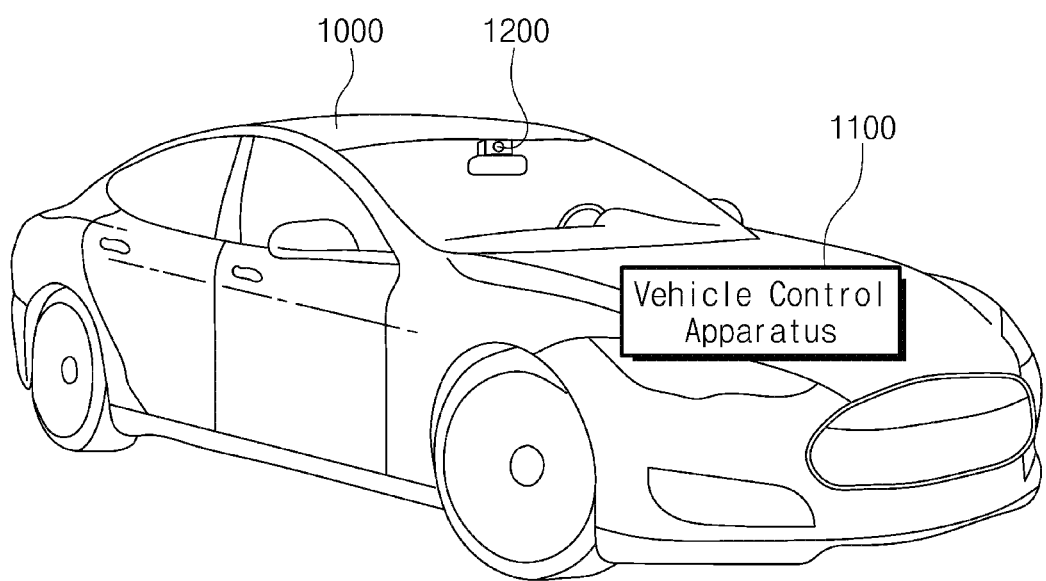
FIGS. 10 and 11 are views illustrating an autonomous vehicle equipped with a vehicle control apparatus according to an embodiment of the disclosure.
Figure 11:
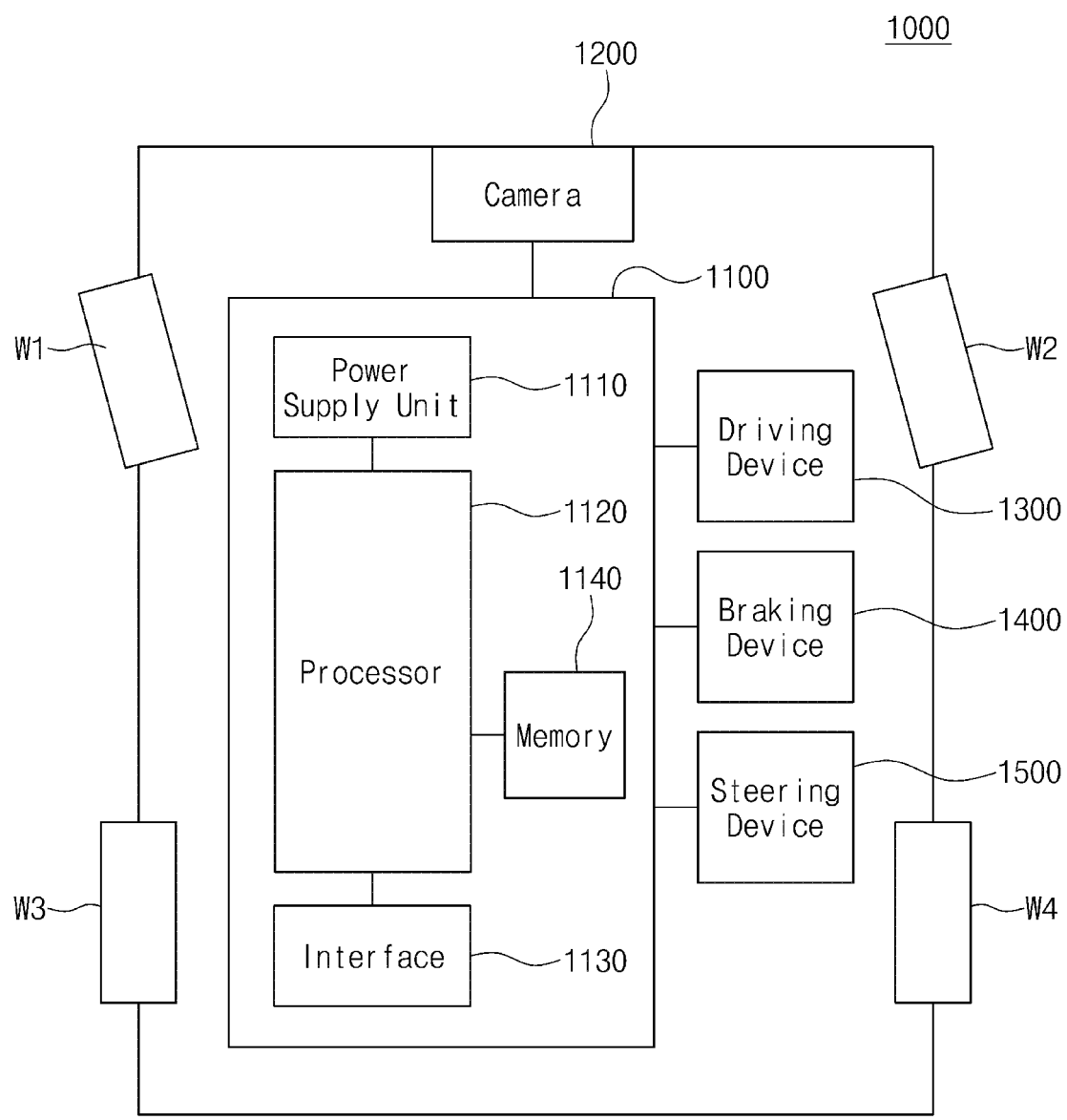

FIGS. 10 and 11 are views illustrating an autonomous vehicle equipped with a vehicle control apparatus according to an embodiment of the disclosure. Referring to FIGS. 10 and 11, an autonomous vehicle 1000 may include a vehicle control apparatus 1100, a camera 1200, a driving device 1300, a braking device 1400, and a steering device 1500.

The autonomous vehicle 1000 refers to a vehicle capable of being driven automatically without the driving manipulation of a human. The vehicle is defined as the means of transport running on a road or track, and includes a vehicle, a train, and a motorcycle. The vehicle may be a concept including all of an internal combustion engine vehicle including an engine as a power source, a hybrid vehicle including an engine and an electric motor as a power source, an electric vehicle including an electric motor as a power source, and the like.

The vehicle control apparatus 1100 may include a power supply unit 1110, a processor 1120, an interface 1130, and a memory 1140. The vehicle control apparatus 1100 may control the autonomous driving of a vehicle inside the autonomous vehicle 1000. The vehicle control apparatus 100 according to FIG. 2 may be applied to the vehicle control apparatus 1100.

According to the embodiment, the vehicle control apparatus 1100 may obtain object information from a vehicle external image captured by the camera 1200 and may control the driving of the autonomous vehicle 1000 based on the object information. When a reflective image is included in the vehicle external image depending on driving environments, the vehicle control apparatus 1100 may enter a caution mode and may generate the vehicle external image in which the reflective image is removed. The vehicle control apparatus 1100 may again obtain the object information based on the vehicle external image in which the reflective image is removed, and may control the driving of the autonomous vehicle 1000 based on the object information, thereby realizing an autonomous driving robust to changes in driving environments.

The vehicle control apparatus 1000 may include at least one printed circuit board (PCB). The power supply unit 1110, the processor 1120, the interface 1130, and the memory 1140 may be electrically connected to the PCB.

The power supply unit 1110 may supply power to the vehicle control apparatus 1100. The power supply unit 1110 may receive power from a power source (e.g., a battery) included in the autonomous vehicle 1000, and then may supply power to each unit of the vehicle control apparatus 1100.

The processor 1120 may be electrically connected to the power supply unit 1110, the interface 1130, and the memory 1140 to exchange signals. The processor 1120 may include at least one of the object detection unit 110, the reflective area setting unit 120, the reflective image removal unit 130, the reliability determination unit 140, the control unit 170, the driving route determination unit 150, and the vehicle control unit 160 according to FIG. 2. The description about specific units inside the processor 1120 is similar to that of FIG. 2, and thus is omitted.

According to an embodiment, the processor 1120 may include the object detection unit 110, the reflective area setting unit 120, the reflective image removal unit 130, the reliability determination unit 140, and the control unit 170. In this case, the vehicle control apparatus 1100 including the processor 1120 may be referred to as an "object detection device". The driving route determination unit 150 and the vehicle control unit 160 according to FIG. 2 may be implemented by a separate processor.

The processor 1120 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

The processor 1120 may be driven by the power provided from the power supply unit 1110. In a state where power is supplied by the power supply unit 1110, the processor 1120 may receive data, may process data, may generate a signal, and may provide a signal. The processor 1120 may receive information from another electronic device inside the autonomous vehicle 1000 through the interface 1130. The processor 1120 may provide a control signal to the other electronic device inside the autonomous vehicle 1000 through the interface 1130.

The interface 1130 may exchange signals with at least one electronic device provided inside the autonomous vehicle 1000 by wire or wirelessly. The interface 1130 may exchange signals with at least one of the driving device 1300, the braking device 1400, and the steering device 1500 by wire or wirelessly. The interface 1130 may be composed of at least one of a communication module, a terminal, a pin, a cable, a port, a circuit, an element, and a device.

The memory 1140 may store basic data for a unit, control data for operation control of a unit, and input/output data. The memory 1140 may store data processed by the processor 1120. The memory 1140 may be implemented with at least one of ROM, RAM, EPROM, flash drive, or hard drive in the form of hardware. The memory 1140 may store various pieces of data for the overall operation of the vehicle control apparatus 1100, such as a program for the processing or control of the processor 1120.

The camera 1200 may obtain a vehicle external image. The camera 1200 may provide the obtained vehicle external image to the vehicle control apparatus 1100. The camera 1200 may include at least one lens and at least one image sensor to obtain the vehicle external image. Besides, the camera 1200 may further include at least one processor that processes a signal received while being electrically connected to the image sensor and generates data for an object based on the processed signal.

The camera 1200 may be at least one of a mono camera, a stereo camera, or an Around View Monitoring (AVM) camera. The camera 1200 may obtain location information of an object, information about the distance to an object, or information about a relative speed of an object, using various image processing algorithms.

To obtain an image in front of a vehicle, the camera 1200 may be disposed in the interior of the vehicle to be close to the front windshield. There may be a plurality of cameras 1200. The camera 1200 may further include a rear camera for obtaining an image of the rear of the vehicle, or a side camera for obtaining an image of the side of the vehicle. The installation location and number of the camera 1200 are not limited thereto.

The driving device 1300 may include a power train driving device. The power train driving device may include a power source driving device and a transmission driving device. For example, when a fossil fuel-based engine is a power source, the driving device 1300 may control the output torque of the engine. For example, when an electric energy-based motor is a power source, the driving device 1300 may control the rotation speed or torque of the motor. To increase the speed of the vehicle, the vehicle control apparatus 1100 may generate an acceleration input signal and may provide the driving device 1300 with the acceleration input signal.

The braking device 1400 may control the braking of each of wheels W1, W2, W3, and W4. The braking device 1400 may control the operation of a brake disposed on each of the wheels W1, W2, W3, and W4. To reduce the speed of a vehicle, the vehicle control apparatus 1100 may generate a deceleration input signal and then may provide the deceleration input signal to the braking device 1400. The braking device 1400 may individually control each of a plurality of brakes.

The steering device 1500 may change the traveling direction of a vehicle. The steering device 1500 may adjust the angle of the front wheels W1 and W2, may adjust the angle of the rear wheels W3 and W4, or may adjust the angle of the four wheels W1, W2, W3, and W4. To change the traveling direction of the vehicle, the vehicle control apparatus 1100 may generate a steering input signal and then may provide the steering input signal to the steering device 1500.

Although not shown in FIGS. 10 and 11, the autonomous vehicle 1000 may further include electronic devices such as a user interface device, a V2X communication device, an ADAS driving system, a sensor, a GPS, and the like. Furthermore, the autonomous vehicle 1000 may include a main Electronic Control Unit (ECU) that controls the overall operation of at least one electronic device provided in the autonomous vehicle 1000. The at least one electronic device provided in the autonomous vehicle 1000 may exchange signals via an internal communication system. The internal communication system may use at least one communication protocol (e.g., CAN, LIN, FlexRay, MOST, or Ethernet).

The above description refers to embodiments for implementing the disclosure. Embodiments according to the disclosure may be implemented with a computer-readable code in a medium in which a program is recorded. The computer-readable recording medium may include all kinds of storage devices in which data readable by a computer system are stored. Embodiments in which a design is changed simply or which are easily changed may be included in the disclosure as well as an embodiment described above. In addition, technologies that are easily changed and implemented by using the above embodiments may be included in the disclosure. While the disclosure has been described with reference to some embodiments thereof, it will be apparent to those of ordinary skill in the art that various changes and modifications may be made thereto without departing from the spirit and scope of the disclosure as set forth in the following claims.

According to an embodiment of the disclosure, a vehicle external image in which a reflective image is removed may be obtained by entering the caution mode to perform clustering within the set reflective area, in a driving environment in rain or snow.

Furthermore, vehicle driving may be controlled based on highly-reliable object information, and the stability of autonomous driving may be improved, by performing reliability evaluation on the object obtained through the vehicle external image in which the reflective image is removed.

While the disclosure has been described with reference to some embodiments thereof, it will be apparent to those of ordinary skill in the art that various changes and modifications may be made thereto without departing from the spirit and scope of the disclosure as set forth in the following claims.

What is claimed is:

1. An operating method of a vehicle control apparatus controlling autonomous driving of a vehicle based on a vehicle external object, the method comprising:
   performing primary object detection based on a first vehicle external image received from a camera to obtain first object information;
   setting a first reflective area for reflection light based on the first object information;
   generating a second vehicle external image, in which a reflective image inside the first reflective area is removed from the first vehicle external image, using pixel values inside the first reflective area;
   performing secondary object detection based on the second vehicle external image to obtain second object information;
   determining reliability of the second object information based on information about the reflective image and the second object information; and
   when the reliability of the second object information is higher than a setting value, controlling the autonomous driving of the vehicle based on the second object information,
   wherein the obtaining of the first object information includes:
      detecting a light source from the first vehicle external image; and
      obtaining the first object information including at least one of location information, size information, brightness information, and color information of the light source,
   wherein the setting of the first reflective area includes:
      detecting a road horizontal line from the first vehicle external image;
      determining a horizontal location of the first reflective area corresponding to an intersection point between a center line of the light source and the road horizontal line;
      determining a width of the first reflective area proportional to a width of the light source, based on the first object information; and
      determining a length of the first reflective area extending in a first direction from the road horizontal line, and
   wherein the first direction is a y-axis direction perpendicular to the road horizontal line, and wherein the generating of the second vehicle external image includes:
  calculating the pixel values inside the first reflective area;
  generating a cluster corresponding to the reflective image based on the pixel values;
  setting a second reflective area included in the first reflective area based on the cluster, and
  removing the cluster within the second reflective area.

2. The method of claim 1, further comprising:
obtaining driving environment information including at least one of driving time information, driving weather information, and road state information, and operating mode information about whether the vehicle is in an autonomous driving mode; and
setting a control mode based on the driving environment information and the operating mode information,
wherein the vehicle control apparatus controls the autonomous driving of the vehicle based on the second object information when the determined control mode is a caution mode, and
wherein the vehicle control apparatus controls the autonomous driving of the vehicle based on the first object information when the determined control mode is a normal mode.

3. The method of claim 1, wherein the length of the first reflective area extends in the first direction from one end in the first direction of the light source when the light source is positioned in the first direction from the road horizontal line.

4. The method of claim 1, wherein the generating of the cluster includes:
  calculating a reference pixel value based on the first object information;
  detecting pixels having a pixel value, which is not less than the reference pixel value, inside the first reflective area; and
  generating the cluster by clustering the pixels.

5. The method of claim 1, wherein the setting of the second reflective area includes:
  calculating a center point location, a first direction size, and a second direction size of the cluster; and
  setting the second reflective area of a size, which is more increased by a first setting value in a first direction than the first direction size, and is more increased by a second setting value in a second direction than the second direction size, at the center point location.

6. The method of claim 1, wherein the second reflective area is divided into a first area inside the cluster and a second area outside the cluster, and
wherein the removing of the cluster includes:
  replacing first pixel values inside the first area with an average value of second pixel values inside the second area.

7. The method of claim 1, wherein the determining of the reliability of the second object information includes:
  setting an object detection area based on the second object information;
  detecting an overlapping area in which the object detection area overlaps with the second reflective area;
  calculating an intersection over union (IoU) value based on the overlapping area; and
  comparing the IoU value with a threshold value.

8. The method of claim 7, wherein the calculating of the IoU value includes:
  when the overlapping area includes a plurality of overlapping areas, calculating the IoU value for each of the plurality of overlapping areas.

9. The method of claim 7, wherein the comparing of the IoU value with the threshold value includes:
  when the IoU value is less than the threshold value, determining that the reliability of the second object information is higher than the setting value; and
  when the IoU value is greater than the threshold value, determining that the reliability of the second object information is lower than the setting value.

10. The method of claim 9, further comprising:
  when it is determined that the reliability of the second object information is lower than the setting value, setting a third reflective area of a size smaller than the second reflective area.

11. The method of claim 1, wherein the controlling of the autonomous driving of the vehicle includes:
  determining a driving route based on the second object information; and
  controlling at least one of a vehicle driving device, a vehicle braking device, and a vehicle steering device such that the vehicle drives autonomously along the driving route.

12. A vehicle control apparatus controlling autonomous driving of a vehicle based on a vehicle external object, the apparatus comprising:
  a controller connected to at least one processor configured to control entry into a caution mode, based on driving environment information and operating mode information;
  an object detector connected to the at least one processor configured to perform primary object detection based on a vehicle external image to obtain first object information, and to perform secondary object detection based on a ghost-removal image to output second object information, in the caution mode;
  a reflective area setter connected to the at least one processor configured to set a first reflective area for reflection light based on the first object information, in the caution mode;
  a reflective image remover connected to the at least one processor configured to generate the ghost-removal image, in which a reflective image inside a first reflective area is removed from the vehicle external image, based on pixel values inside the first reflective area;
  a reliability determinator connected to the at least one processor configured to determine reliability of the second object information based on the second object information and information about the reflective image; and
  a vehicle controller connected to the at least one processor configured to control the autonomous driving of the vehicle based on the second object information when the reliability of the second object information is higher than a setting value,
wherein the obtained first object information includes:
  a light source from the first vehicle external image; and
  at least one of location information, size information, brightness information, and color information of the light source,
wherein the first reflective area includes:
  a road horizontal line from the first vehicle external image;
  a horizontal location of the first reflective area corresponding to an intersection point between a center line of the light source and the road horizontal line;
  a width of the first reflective area proportional to a width of the light source, based on the first object information; and a length of the first reflective area extending in a first direction from the road horizontal line, and wherein the first direction is a y-axis direction perpendicular to the road horizontal line, wherein the outputted second object information includes:
- calculating the pixel values inside the first reflective area;
- generating a cluster corresponding to the reflective image based on the pixel values;
- setting a second reflective area included in the first reflective area, based on the cluster; and
- removing the cluster within the second reflective area.

13. The apparatus of claim 12, wherein the controller controls the reflective area setter, the reflective image remover, and the reliability determinator to be deactivated, in a normal mode.

* * * * *